United States Patent
Mariyama et al.

(10) Patent No.: US 11,373,110 B2
(45) Date of Patent: Jun. 28, 2022

(54) APPARATUS AND NETWORK CONSTRUCTION METHOD FOR DETERMINING THE NUMBER OF ELEMENTS IN AN INTERMEDIATE LAYER OF A NEURAL NETWORK

(71) Applicant: Mitsubishi Electric Corporation, Tokyo (JP)

(72) Inventors: Toshisada Mariyama, Tokyo (JP); Kunihiko Fukushima, Tokyo (JP); Wataru Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 606 days.

(21) Appl. No.: 16/333,390

(22) PCT Filed: Oct. 3, 2016

(86) PCT No.: PCT/JP2016/079283
§ 371 (c)(1),
(2) Date: Mar. 14, 2019

(87) PCT Pub. No.: WO2018/066032
PCT Pub. Date: Apr. 12, 2018

(65) Prior Publication Data
US 2019/0251399 A1 Aug. 15, 2019

(51) Int. Cl.
*G06N 7/00* (2006.01)
*G06N 3/04* (2006.01)
(Continued)

(52) U.S. Cl.
CPC ............ *G06N 7/00* (2013.01); *G06N 3/04* (2013.01); *G06N 3/08* (2013.01); *G06N 3/082* (2013.01); *G06K 9/6264* (2013.01)

(58) Field of Classification Search
CPC .. G06N 3/04; G06N 3/08; G06N 7/00; G06N 20/00; G06N 99/005; G06K 9/6264
See application file for complete search history.

(56) References Cited

U.S. PATENT DOCUMENTS 5,790,758 A * 8/1998 Streit ............... G06K 9/6277
706/33
7,243,056 B2 * 7/2007 Olhofer ............ G06N 3/126
703/7
(Continued)

FOREIGN PATENT DOCUMENTS

CN 102737278 A 10/2012
JP 6-314268 A 11/1994
(Continued)

OTHER PUBLICATIONS

Wilson et al., "Deep Kernel Learning" Nov. 6, 2015, arXiv: 1511.02222v1, pp. 1-19. (Year: 2015).*
(Continued)

*Primary Examiner* — Miranda M Huang
*Assistant Examiner* — Chase P. Hinckley
(74) *Attorney, Agent, or Firm* — Birch, Stewart, Kolasch & Birch, LLP

(57) ABSTRACT

An element construction unit compares output values of one or more elements included in an intermediate layer calculated by an output value calculating unit with a threshold value, and the number of elements included in the intermediate layer is maintained when any of the output values out of the output values of the one or more elements included in the intermediate layer is greater than the threshold value, and the number of elements included in the intermediate layer is increased when all of the output values of the one or more elements included in the intermediate layer are equal to or less than the threshold value.

18 Claims, 6 Drawing Sheets

(51) Int. Cl.
  G06N 3/08 (2006.01)
  G06K 9/62 (2022.01)

(56) References Cited

U.S. PATENT DOCUMENTS

| | | | |
|---|---|---|---|
| 9,189,730 B1 | 11/2015 | Coenen et al. | |
| 9,633,274 B2* | 4/2017 | Tuzel | G06K 9/6277 |
| 9,704,257 B1* | 7/2017 | Tuzel | G06K 9/6297 |
| 9,830,558 B1* | 11/2017 | Chaudhuri | G06N 20/10 |
| 9,990,592 B2* | 6/2018 | Perediry | G06N 20/10 |
| 10,311,356 B2* | 6/2019 | Gu | G06N 3/08 |
| 10,325,200 B2* | 6/2019 | Yu | G06N 3/04 |
| 10,692,004 B1* | 6/2020 | Segev | G06Q 50/01 |
| 10,776,691 B1* | 9/2020 | Ghahramani | G06N 3/0454 |
| 2004/0215430 A1 | 10/2004 | Huddleston et al. | |
| 2011/0112428 A1 | 5/2011 | Hsieh et al. | |
| 2012/0254086 A1 | 10/2012 | Deng et al. | |
| 2013/0282634 A1 | 10/2013 | Deng et al. | |
| 2013/0325776 A1* | 12/2013 | Ponulak | G05B 13/027 706/25 |
| 2014/0358831 A1* | 12/2014 | Adams | G06N 20/00 706/12 |
| 2015/0340032 A1* | 11/2015 | Gruenstein | G06N 3/08 704/232 |
| 2016/0019459 A1* | 1/2016 | Audhkhasi | G06N 3/08 706/22 |
| 2016/0307071 A1* | 10/2016 | Perronnin | G06K 9/66 |
| 2016/0379352 A1* | 12/2016 | Zhang | G06N 3/0454 382/157 |
| 2017/0249401 A1* | 8/2017 | Eckart | G06V 10/955 |
| 2018/0032866 A1* | 2/2018 | Son | G06N 3/04 |
| 2018/0082172 A1* | 3/2018 | Patel | G06N 3/0472 |
| 2018/0082204 A1* | 3/2018 | Iwamasa | G05B 17/02 |
| 2018/0106918 A1* | 4/2018 | Thore | G01V 1/306 |
| 2018/0151177 A1* | 5/2018 | Gemmeke | G10L 15/065 |
| 2018/0225550 A1* | 8/2018 | Jacobsen | G06N 3/04 |
| 2018/0373977 A1* | 12/2018 | Carbon | G06N 3/0481 |
| 2019/0257787 A1* | 8/2019 | Washio | G01N 27/44791 |
| 2019/0310590 A1* | 10/2019 | Guntoro | G05B 13/027 |
| 2020/0293594 A1* | 9/2020 | Raissi | G06N 20/00 |
| 2021/0279955 A1* | 9/2021 | Michael | G06V 20/56 |

FOREIGN PATENT DOCUMENTS

| | | |
|---|---|---|
| JP | 2000-259598 A | 9/2000 |
| JP | 2011-221927 A | 11/2011 |
| TW | 201116256 A1 | 5/2011 |

OTHER PUBLICATIONS

Hendrycks et al., "Bridging Nonlinearities and Stochastic Regularizers with Gaussian Error Linear Units" Jul. 8, 2016, arXiv: 1606.08415v2, pp. 1-7. (Year: 2016).*
DiCecco et al., "Caffeinated FPGAs: FPGA Framework for Convolutional Neural Networks" Sep. 30, 2016, arXiv: 1609.09671v1. (Year: 2016).*
Wilson et Nickisch, "Kernel Interpolation for Scalable Structured Gaussian Processes (KISS-GP)" Mar. 3, 2015, arXiv: 1503.01057v1, pp. 1-19. (Year: 2015).*
Li et Marlin, "A scalable end-to-end Gaussian process adapter for irregularly sampled time series classification" Jun. 14, 2016, arXiv: 1606.04443v1, pp. 1-11. (Year: 2016).*
Kingma et al., "Improving Variational Inference with Inverse Autoregressive Flow" Jun. 15, 2016, arXiv: 1606.04934v1, pp. 1-10. (Year: 2016).*
Fukushima et Shouno, "Deep Convolutional Network Neocognitron: Improved Interpolating-Vector" Jul. 2015, pp. 1-8. (Year: 2015).*
Ba et al., "Layer Normalization" Jul. 21, 2016, arXiv: 1607.06450v1, pp. 1-14. (Year: 2016).*
Tran et al., "The Variational Gaussian Process" Apr. 17, 2016, arXiv: 1511.06499v4, pp. 1-14. (Year: 2016).*
Vemulapelli et al., "Gaussian Conditional Random Field Network for Semantic Segmentation" Jun. 2016. (Year: 2016).*
Vanhatalo et al., "Bayesian Modeling with Gaussian Processes using the GPstuff Toolbox" Jul. 15, 2015, arXiv: 1206.5754v6. (Year: 2015).*
Zhou et al., "A Gaussian Function Based Chaotic Neural Network" 2010, pp. 203-206. (Year: 2010).*
TensorFlow Playground, Apr. 2016, screenshots Wayback Internet Archive. (Year: 2016).*
Huang et al., "Scalable Gaussian Process Regression Using Deep Neural Networks" Jun. 27, 2015, pp. 3576-3582. (Year: 2015).*
Louizos et Welling, "Structured and Efficient Variational Deep Learning with Matrix Gaussian Posteriors" Jun. 23, 2016, arXiv: 1603.04733v5. (Year: 2016).*
Kandemir, Melih, "Asymmetric Transfer Learning with Deep Gaussian Processes" 2015. (Year: 2015).*
Ha et al., "Hypernetworks" Sep. 27, 2016, arXiv: 1609.09106v1, pp. 1-23. (Year: 2016).*
Sarno et al., "String and Membrane Gaussian Processes" Aug. 19, 2016, pp. 1-87. (Year: 2016).*
Ulyanov et al., "Instance Normalization: The Missing Ingredient for Fast Stylization" Sep. 20, 2016, pp. 1-6. (Year: 2016).*
Moeller et al., "Continuous Kernel Learning" Sep. 2016. (Year: 2016).*
Li et Marlin, "A scalable end-to-end Gaussian process adapter for irregularly sampled time series classification" Jun. 14, 2016, pp. 1-11. (Year: 2016).*
Al-Shedivat et al., "Scalable GP-LSTMs with Semi-Stochastic Gradients" 2016, pp. 1-3. (Year: 2016).*
Solin, Arno "Stochastic Differential Equation Methods for Spatio-Temporal Gaussian Process Regression" 2016, pp. 1-60. (Year: 2016).*
Fukushima, "Artificial vision by multi-layered neural networks: Neocognitron and its advances," Neural Networks, vol. 37, 2013, pp. 103-119.
International Search Report (PCT/ISA/210) issued in PCT/JP2016/079283, dated Nov. 22, 2016.
Taiwanese Office Action issud in Application No. 106105854, dated Jun. 7, 2018.
German Office Action for German Application No. 11 2016 007 312.7, dated Jun. 8, 2021, with English translation.
Saber et al., "An Effective Intelligent Self-Construction Multilayer Perceptron Neural Network". International Journal of Computer Applications (0975-8887), vol. 98, No. 11, Jul. 2014, pp. 23-28.
Sibi et al., "Analysis of Different Activation Functions Using Back Propagation Neural Networks", Journal of Theoretical and Applied Information Technology, vol. 47, No. 3, Jan. 31, 2013, pp. 1264-1268.
Zhou et al., "A Gaussian Function Based Chaotic Neural Network", 2010 International Conference on Computer Application and Systems Modeling (ICCASM 2010), 2010, pp. V4-203-V4-206 (pp. 1-4).
Indian Office Action for Indian Application No. 201947009506, dated Jun. 2, 2021, with an English translation.
Korean Office Action dated Apr. 16, 2019, for corresponding Korean Patent Application No. 10-2019-7008947, with English translation.
Unknown, "Multilayer Neural Networks" [concepts], https://happycontrol.tistory.com, Oct. 26, 2014, 4 pages total.

* cited by examiner

APPARATUS AND NETWORK CONSTRUCTION METHOD FOR DETERMINING THE NUMBER OF ELEMENTS IN AN INTERMEDIATE LAYER OF A NEURAL NETWORK

TECHNICAL FIELD

The present invention relates to a network construction apparatus and a network construction method for constructing a neural network.

BACKGROUND ART

A neural network is a network in which an input layer, an intermediate layer, and an output layer are connected in cascade.

The neural network is a kind of approximation function for predicting output data corresponding to arbitrary input data when arbitrary input data is given, by learning a correlation between input data and output data in advance.

A structure of the neural network such as the number of elements included in the intermediate layer is often determined manually by a designer of the neural network, but it is difficult for a designer who is not familiar with the neural network to properly determine the structure of the neural network.

In the following Non-Patent Literature 1, a network construction method is disclosed for automatically determining a structure of a neural network by using a technique called Add if Silent (AiS).

This neural network is a neural network imitating visual information processing of organisms called neocognitron, and an element included in the intermediate layer of this neural network is an element whose input/output response is determined by a normalized linear function.

CITATION LIST

Non-Patent Literature

Non-Patent Literature 1: Fukushima, K.: "Artificial vision by multi-layered neural networks: Neocognitron and its advances", Neural Networks, vol. 37, pp. 103-119 (2013).

SUMMARY OF INVENTION

Technical Problem

Since the conventional network construction method is configured as described above, when the element included in the intermediate layer is an element whose input/output response is determined by a normalized linear function, the number of elements included in the intermediate layer and the like can be automatically determined. However, there has been a problem that, in a case where the element included in the intermediate layer is an element whose input/output response is determined by a Gaussian function, even when the technique called AiS is used, the number of elements included in the intermediate layer and the like cannot be automatically determined.

The present invention has been made to solve the above problem, and it is an object to obtain a network construction apparatus and a network construction method capable of automatically determining the number of elements included in the intermediate layer even when the element included in the intermediate layer is an element whose input/output response is determined by a Gaussian function.

Solution to Problem

A network construction apparatus according to the present invention is provided with an initial setting unit for initializing, for each element included in an intermediate layer, parameters of a Gaussian function related to the element when a neural network is constructed, the neural network including the intermediate layer including an element whose input/output response is determined by the Gaussian function, and an output value calculating unit for calculating output values of one or more elements included in the intermediate layer in accordance with the parameters initialized by the initial setting unit and an output value of an element included in an input layer of the neural network, and an element construction unit compares the output values of the one or more elements calculated by the output value calculating unit with a threshold value, and maintains a number of elements included in the intermediate layer when an output value of any of the elements out of the output values of the one or more elements included in the intermediate layer is greater than the threshold value, and performs element construction processing of increasing the number of elements included in the intermediate layer when all of the output values of the one or more elements included in the intermediate layer are equal to or less than the threshold value.

Advantageous Effects of Invention

According to the present invention, the element construction unit compares the output values of the one or more elements calculated by the output value calculating unit with a threshold value, and maintains a number of elements included in the intermediate layer when an output value of any of the elements out of the output values of the one or more elements included in the intermediate layer is greater than the threshold value, and performs element construction processing of increasing the number of elements included in the intermediate layer when all of the output values of the one or more elements included in the intermediate layer are equal to or less than the threshold value, so that there is an effect that the number of elements included in the intermediate layer can be automatically determined even when the element included in the intermediate layer is an element whose input/output response is determined by a Gaussian function.

BRIEF DESCRIPTION OF DRAWINGS

FIG. 4 is a hardware configuration diagram of a computer in a case where the network construction apparatus is implemented by software, firmware, or the like.

FIG. 5 is a flowchart illustrating a network construction method that is a processing procedure in the case where the network construction apparatus is implemented by software, firmware, or the like.

FIG. 6 is a flowchart illustrating a network construction method that is a processing procedure in the case where the network construction apparatus is implemented by software, firmware, or the like.

FIG. 8 is a flowchart illustrating a network construction method that is a processing procedure in the case where the network construction apparatus is implemented by software, firmware, or the like.

DESCRIPTION OF EMBODIMENTS

Hereinafter, to explain the present invention in more detail, embodiments for carrying out the present invention will be described with reference to the accompanying drawings.

In a case where the input/output response of an element included in an intermediate layer of a neural network is a normalized linear function, for example, when positive data deviating largely from an assumed range is input to the intermediate layer, it is assumed that large positive data is output from the intermediate layer. As a result, it is assumed that large positive data is also output from an output layer.

Thus, for example, when data deviating largely from the assumed range is input to the intermediate layer, large positive data is output from the output layer of the neural network, so that an apparatus on the output side of the neural network may be largely affected.

In a case where the input/output response of the element included in the intermediate layer of the neural network is a Gaussian function, for example, when positive or negative data deviating largely from the assumed range is input to the intermediate layer, data close to zero is output from the intermediate layer. As a result, data close to zero is also output from the output layer.

Thus, for example, even when the data deviating largely from the assumed range is input to the intermediate layer, the data close to zero is output from the output layer of the neural network, so that the apparatus on the output side of the neural network can avoid a large influence.

First Embodiment

Figure 1:
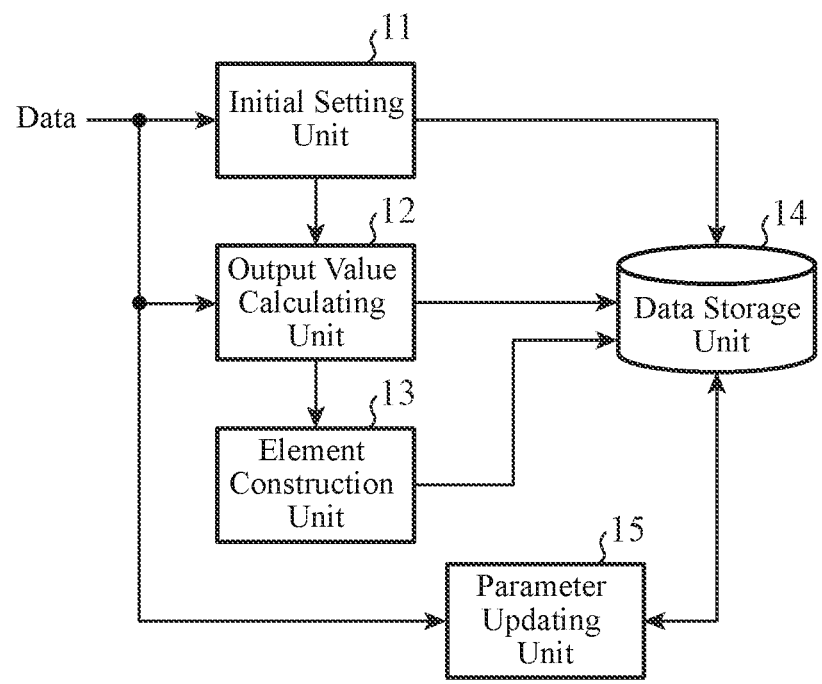
FIG. 1 is a configuration diagram illustrating a network construction apparatus according to a first embodiment of the present invention.
Figure 2:
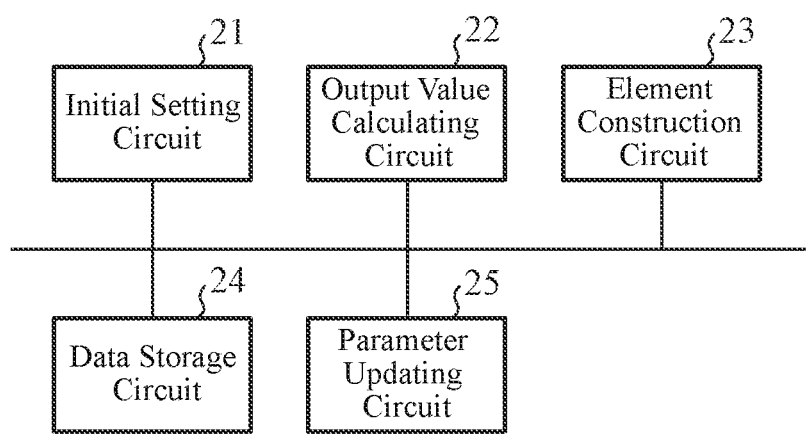
FIG. 2 is a hardware configuration diagram of the network construction apparatus according to the first embodiment of the present invention.

FIG. 1 is a configuration diagram illustrating a network construction apparatus according to a first embodiment of the present invention, and FIG. 2 is a hardware configuration diagram of the network construction apparatus according to the first embodiment of the present invention.

Figure 3:
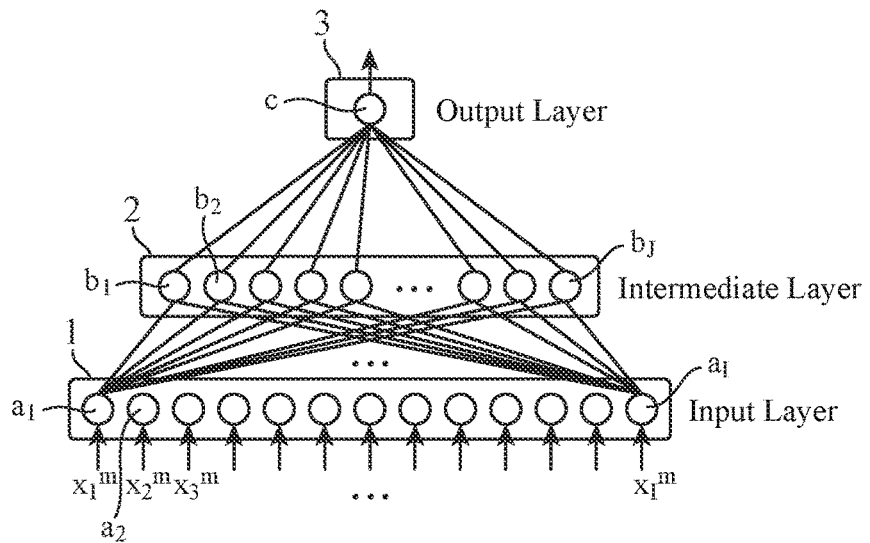
FIG. 3 is an explanatory diagram illustrating an example of a neural network to which the network construction apparatus according to the first embodiment of the present invention is applied.

FIG. 3 is an explanatory diagram illustrating an example of a neural network to which the network construction apparatus according to the first embodiment of the present invention is applied.

In FIGS. 1 to 3, the neural network includes an input layer 1, an intermediate layer 2, and an output layer 3.

In the first embodiment, an example in which the number of intermediate layers 2 is one will be described, and an example in which the number of intermediate layers 2 is two or more will be described in a second embodiment.

The input layer 1 includes I (I is an integer equal to or greater than 1) elements $a_i$ (i=1, . . . , I), and, for example, M (M is an integer equal to or greater than 1) pieces of learning data $x^m=(x_1^m, x_2^m, \ldots, x_I^m)$ are sequentially given from a sensor or the like. The superscript m represents m=1, 2, . . . , M.

The number of dimensions of the learning data $x^m$ is I, and $x_i^m$ (i=1, . . . , I) included in the learning data $x^m$ is referred to as component data.

When the i-th component data $x_i^m$ (i=1, . . . , I) of the learning data $x^m$ is given to the i-th element $a_i$ (i=1, . . . , I), the input layer 1 outputs $y_i=x_i^m$ as an output value of the i-th element $a_i$ for the j-th element $b_j$ (j=1, . . . , J) included in the intermediate layer 2.

The intermediate layer 2 includes J (J is an integer equal to or greater than 1) elements $b_j$ (j=1, . . . , J), and the j-th element $b_j$ is an element whose input/output response is determined by a Gaussian function.

However, in the first embodiment, for convenience of description, it is assumed that the number of elements included in the intermediate layer 2 is zero before construction of the network by the network construction apparatus. This is merely an example, and the intermediate layer 2 may include one or more elements even before the construction of the network by the network construction apparatus.

When the output value $y_i$ (i=1, . . . , I) of the I elements $a_i$ included in the input layer 1 is given to the j-th element $b_j$, the intermediate layer 2 calculates an output value $z_j$ (j=1, . . . , J) of the j-th element $b_3$ from the output value $y_i$ of the I elements $a_i$, and outputs the output value $z_j$ of the element $b_3$ to the output layer 3.

The output layer 3 includes an element c, and the element c calculates, for example, a sum of products of the output values $z_j$ (j=1, . . . , J) of the J elements $b_j$ included in the intermediate layer 2 and a weight $v_j$ (j=1, . . . , J) between the intermediate layer 2 and the output layer 3, and outputs the sum.

FIG. 3 illustrates an example in which the number of the elements c included in the output layer 3 is one; however, a plurality of the elements c may be included.

An initial setting unit 11 is implemented by, for example, an initial setting circuit 21 in FIG. 2.

The initial setting unit 11 performs processing of initializing parameters of the Gaussian function related to the element $b_j$ for each element included in the intermediate layer 2.

The initial setting unit 11 initializes, as the parameters of the Gaussian function, for example, a standard deviation value $\sigma_{i,j}$ of a Gaussian distribution, a center coordinate $\mu_{i,j}$ of the Gaussian function, and a weight $W_{i,j}$ between the i-th element $a_i$ included in the input layer 1 and the j-th element $b_j$ included in the intermediate layer 2.

The standard deviation value $\sigma_{i,j}$ of the Gaussian distribution is a standard deviation value of, for example, the output values $y_i$ (i=1, . . . , I) of the I elements $a_i$ for the j-th element $b_j$ included in the intermediate layer 2.

The center coordinate $\mu_{i,j}$ of the Gaussian function is a component of the center of the j-th element $b_j$ included in the intermediate layer 2.

An output value calculating unit 12 is implemented by, for example, an output value calculating circuit 22 in FIG. 2.

As initial values of the parameters of the Gaussian function, the standard deviation value $\sigma_{i,j}$ of the Gaussian distribution, the center coordinate $\mu_{i,j}$ of the Gaussian function, and the weight $W_{i,j}$ are given from the initial setting unit 11 to the output value calculating unit 12.

The output value calculating unit 12 performs processing of calculating the output value $z_j$ (J=1, . . . , J) of the j-th element $b_j$, by substituting, for example, the output values $y_i$ (i=1, . . . , I) of the I elements $a_i$ included in the input layer 1, to the Gaussian function having the initial values of the parameters given from the initial setting unit 11.

An element construction unit 13 is implemented by, for example, an element construction circuit 23 in FIG. 2.

The element construction unit 13 compares the output values $z_j$ (j=1, . . . , J) of the J elements $b_j$ calculated by the output value calculating unit 12 with a preset threshold value Th, and maintains the number of elements $b_j$ included in the intermediate layer 2 when the output value $z_j$ of any of the elements $b_j$ is greater than the threshold value Th, out of the output values $z_j$ of the J elements $b_j$ included in the intermediate layer 2.

In addition, when all of the output values $z_j$ of the J elements $b_j$ are equal to or less than the threshold value Th, the element construction unit 13 performs element construction processing of increasing the number of elements $b_j$ included in the intermediate layer 2.

A data storage unit 14 is implemented by, for example, a data storage circuit 24 in FIG. 2.

The data storage unit 14 stores the parameters of the Gaussian function related to the element $b_j$ initialized by the initial setting unit 11 and the output value $z_j$ of the element $b_j$ calculated by the output value calculating unit 12 in addition to the number J of the elements $b_j$ included in the intermediate layer 2.

A parameter updating unit 15 is implemented by, for example, a parameter updating circuit 25 in FIG. 2.

The parameter updating unit 15 updates the weight $v_j$ between the j-th element $b_j$ included in the intermediate layer 2 and the element c included in the output layer 3, and the parameters of the Gaussian function stored in the data storage unit 14, by performing supervised learning for learning the parameters of the Gaussian function when the learning data is given to the input layer 1, after the element construction processing is performed by the element construction unit 13.

In addition, the parameter updating unit 15 performs processing of updating the weight $W_{i,j}$ between the i-th element $a_1$ included in the input layer 1 and the j-th element $b_j$ included in the intermediate layer 2 by performing the supervised learning.

In FIG. 1, a network construction apparatus is assumed that the initial setting unit 11, the output value calculating unit 12, the element construction unit 13, the data storage unit 14, and the parameter updating unit 15 that are components of the network construction apparatus are respectively implemented by dedicated hardware circuits, which are the initial setting circuit 21, the output value calculating circuit 22, the element construction circuit 23, the data storage circuit 24, and the parameter updating circuit 25, as illustrated in FIG. 2.

Here, examples of the data storage circuit 24 include a nonvolatile or volatile semiconductor memory such as random access memory (RAM), read only memory (ROM), flash memory, erasable programmable read only memory (EPROM), and electrically erasable programmable read only memory (EEPROM); a magnetic disk, a flexible disk, an optical disc, a compact disc, a mini disc, a digital versatile disc (DVD), and the like.

In addition, examples of the initial setting circuit 21, the output value calculating circuit 22, the element construction circuit 23, and the parameter updating circuit 25 include a single circuit, a composite circuit, a programmed processor, a parallel-programmed processor, an application specific integrated circuit (ASIC), a field-programmable gate array (FPGA), or a combination thereof.

However, the components of the network construction apparatus are not limited to those implemented by dedicated hardware, and the network construction apparatus may be implemented by software, firmware, or a combination of software and firmware.

Software and firmware are stored as programs in a memory of a computer. The computer means hardware for executing a program, and its examples include a central processing unit (CPU), a central processing device, a processing device, an arithmetic device, a microprocessor, a microcomputer, a processor, a digital signal processor (DSP), and the like.

Figure 4:
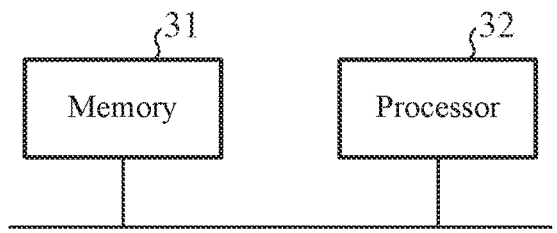

FIG. 4 is a hardware configuration diagram of a computer in a case where the network construction apparatus is implemented by software, firmware, or the like.

In the case where the network construction apparatus is implemented by software, firmware, or the like, it is sufficient that the data storage unit 14 is configured on a memory 31 of the computer, and a program for causing the computer to execute processing procedures of the initial setting unit 11, the output value calculating unit 12, the element construction unit 13, and the parameter updating unit 15 is stored in the memory 31, and a processor 32 of the computer executes the program stored in the memory 31.

Figure 5:
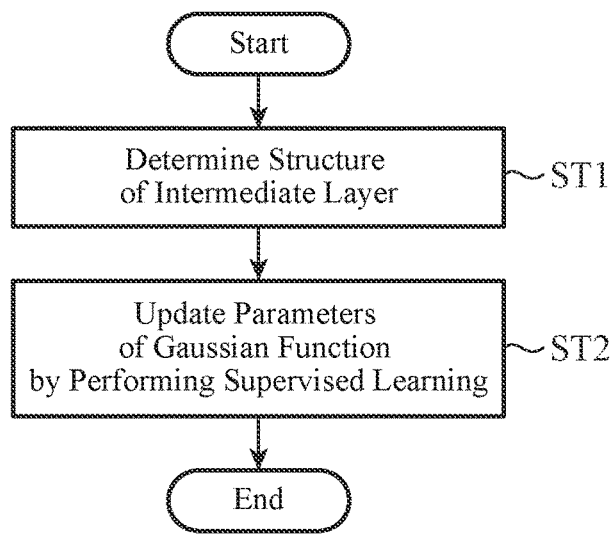
Figure 6:
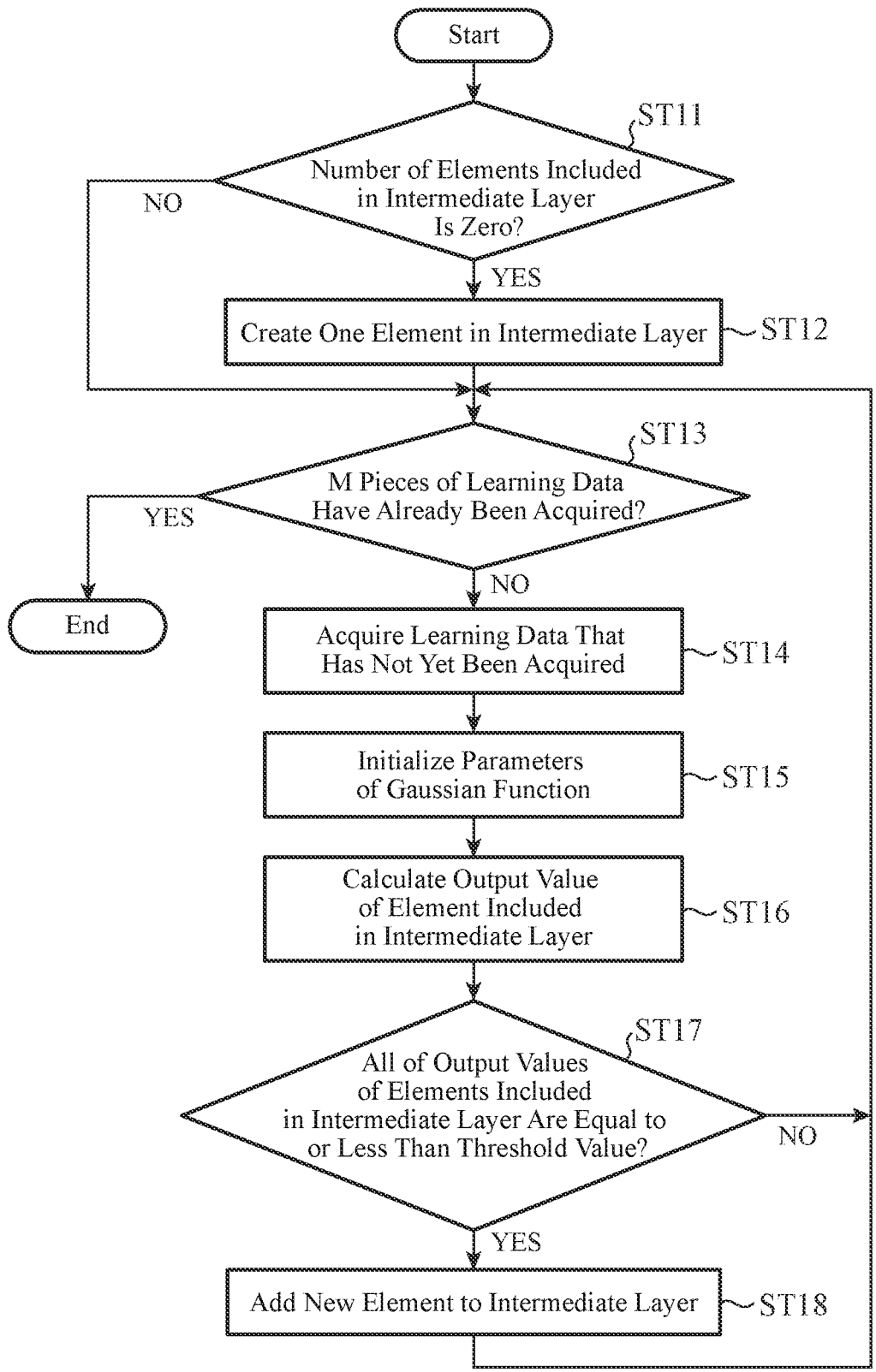

FIGS. 5 and 6 are flowcharts each illustrating a network construction method that is a processing procedure in the case where the network construction apparatus is implemented by software, firmware, or the like.

In addition, FIG. 2 illustrates an example in which each of the components of the network construction apparatus is implemented by dedicated hardware, and FIG. 4 illustrates an example in which the network construction apparatus is implemented by software, firmware, or the like; however, some components of the construction apparatus may be implemented by dedicated hardware and the remaining components may be implemented by software, firmware, or the like.

Next, the operation will be described.

Processing contents of the network construction apparatus in the first embodiment are roughly divided into two processing contents.

A first processing content is a processing content for determining a structure of the intermediate layer 2, that is, a processing content for determining the number J of the elements $b_j$ included in the intermediate layer 2 and initializing the parameters of the Gaussian function related to the element $b_j$ (step ST1 in FIG. 5).

A second processing content is a processing content for updating the initialized parameters of the Gaussian function and the weight $W_{i,j}$ between the i-th element $a_i$ included in the input layer 1 and the j-th element $b_j$ included in the intermediate layer 2 by performing the supervised learning (step ST2 in FIG. 5).

Hereinafter, with reference to FIG. 6, the first processing content will be specifically described.

In the first embodiment, it is assumed that an initial value of the number J of the elements $b_j$ included in the intermediate layer 2 is zero.

In executing the first processing content, the element construction unit 13 determines whether or not the element $b_j$ is included in the intermediate layer 2.

That is, the element construction unit 13 determines whether or not the number J of the elements $b_j$ included in the intermediate layer 2 is zero (step ST11 in FIG. 6).

When it is determined that the number J of the elements $b_j$ included in the intermediate layer 2 is zero (step ST11 in FIG. 6: YES), the element construction unit 13 newly adds one element $b_j$ in the intermediate layer 2. That is, the element construction unit 13 creates an element $b_1$ in the intermediate layer 2 (step ST12 in FIG. 6).

When it is determined that the number J of the elements $b_j$ included in the intermediate layer 2 is not zero (step ST11 of FIG. 6: NO), at this stage, the element construction unit 13 does not perform processing of adding the new element $b_j$ in the intermediate layer 2. In the first embodiment, since the initial value of the number J of the elements $b_j$ included in the intermediate layer 2 is set to zero, here, the element construction unit 13 creates the element $b_1$ in the intermediate layer 2.

When the element construction unit 13 creates the element $b_1$ in the intermediate layer 2, the initial setting unit 11 determines whether or not all of the M pieces of learning data $x^m=(x_1^m, x_2^m, \ldots, x_I^m)$ have already been acquired (step ST13 in FIG. 6).

When the M pieces of learning data $x^m$ have already been acquired (step ST13 in FIG. 6: YES), the initial setting unit 11 ends the first processing content for determining the structure of the intermediate layer 2.

When the M pieces of learning data $x^m$ have not yet been acquired (step ST13 of FIG. 6: NO), the initial setting unit 11 acquires the learning data $x^m$ that has not yet been acquired (step ST14 of FIG. 6).

In the first embodiment, since the M pieces of learning data $x^m$ have not been acquired at this stage, the initial setting unit 11 acquires first learning data $x^1=(x_1^1, x_2^1, \ldots, x_I^1)$ as the learning data $x^m$ that has not yet been acquired.

When the first learning data $x^1=(x_1^1, x_2^1, \ldots, x_I^1)$ is acquired, the initial setting unit 11 initializes parameters of the Gaussian function related to the element $b_1$ included in the intermediate layer 2 from an output value $y_i=x_i^1$ of the i-th element $a_i$ included in the input layer 1 (step ST15 in FIG. 6).

That is, the initial setting unit 11 initializes a standard deviation value $\sigma_{i,1}$ (i=1, ..., I) of the Gaussian distribution as one of the parameters of the Gaussian function related to the element $b_1$ included in the intermediate layer 2.

The standard deviation value $\sigma_{i,1}$ of the Gaussian distribution is a standard deviation value of the output values $y_i=x_i^1$ of the I elements $a_i$ for the element $b_1$ included in the intermediate layer 2, and is calculated from the output values $y_i=x_i^1$ of the I elements $a_i$ included in the input layer 1. Since processing of calculating the standard deviation value $\sigma_{i,1}$ itself is a known technique, a detailed description thereof will be omitted.

In addition, the initial setting unit 11 initializes a center coordinate $\mu_{i,1}$ (i=1, ..., I) of the Gaussian function as one of the parameters of the Gaussian function related to the element $b_1$ included in the intermediate layer 2.

The center coordinate $\mu_{i,1}$ of the Gaussian function is the output value $y_i=x_i^1$ of the i-th element $a_i$ included in the input layer 1, as indicated in the following expression (1).

$$\mu_{i,1}=x_i^1 \quad (1)$$

Further, the initial setting unit 11 initializes a weight $W_{i,j}$ (i=1, ..., I) between the i-th element $a_i$ included in the input layer 1 and the element $b_1$ included in the intermediate layer 2, as one of the parameters of the Gaussian function related to the element $b_1$ included in the intermediate layer 2, as indicated in the following expression (2).

$$W_{i,1}=1 \quad (2)$$

Here, an example is described where the weight $W_{i,j}$ is set to 1; however, this is merely an example, and a value other than 1 may be set.

When the parameters of the Gaussian function related to the element $b_1$ included in the intermediate layer 2 are initialized, the initial setting unit 11 outputs the initial values of the parameters to the output value calculating unit 12, and stores the initial values of the parameters in the data storage unit 14.

The output value calculating unit 12 acquires from the initial setting unit 11 the initial values of the parameters of the Gaussian function related to the element $b_1$ included in the intermediate layer 2.

In addition, the output value calculating unit 12 acquires the first learning data $x^1=(x_1^1, x_{21}^1, \ldots x_I^1)$.

When the first learning data $x^1$ is acquired, the output value calculating unit 12 calculates an output value $z_1$ of the element $b_1$ included in the intermediate layer 2 (step ST16 in FIG. 6).

That is, the output value calculating unit 12 calculates the output value $z_z$ of the element $b_1$ included in the intermediate layer 2, by substituting the initial values of the parameters of the Gaussian function related to the element $b_1$ included in the intermediate layer 2 and the output value $y_i=x_i^1$ of the I elements $a_i$ included in the input layer 1, to the <Gaussian function indicated in the following expression (3).

$$z_1 = \exp\left\{-\sum_{i=1}^{I} \frac{(W_{i,1} y_i - \mu_{i,1})^2}{\sigma_{i,1}^2}\right\} \quad (3)$$

When the output value $z_1$ of the element $b_1$ included in the intermediate layer 2 is calculated, the output value calculating unit 12 outputs the output value $z_1$ of the element $b_1$ to the element construction unit 13, and stores the output value $z_1$ of the element $b_1$ in the data storage unit 14.

When the output value $z_1$ of the element $b_1$ is received from the output value calculating unit 12, the element construction unit 13 compares the output value $z_1$ of the element $b_1$ with the preset threshold value Th (step ST17 in FIG. 6).

Since the output value $z_1$ of the element $b_1$ is 1 at the maximum, as the threshold value Th, a positive real number equal to or less than 1, or a positive real number equal to or greater than $e^{-0.25}$ and equal to or less than 1 is conceivable.

When the output value $z_1$ of the element $b_1$ included in the intermediate layer 2 is greater than the threshold value Th (step ST17 in FIG. 6: NO) the element construction unit 13 maintains the number J (J=1) of the elements included in the intermediate layer 2. When the output value $z_1$ of the element $b_1$ included in the intermediate layer 2 is greater than the threshold value Th, it can be said that the element $b_1$ included in the intermediate layer 2 is an element corresponding to an output value $y_1$ of an element $a_1$ included in the input layer 1. That is, it can be said that the element $b_1$ included in the intermediate layer 2 is an element representing the center coordinate of the Gaussian distribution in the Gaussian function. For this reason, there is no need to add a new element $b_2$ to the intermediate layer 2, so that the element construction unit 13 maintains the number J (J=1) of the elements included in the intermediate layer 2.

When the output value $z_1$ of the element $b_1$ included in the intermediate layer 2 is equal to or less than the threshold value Th (step ST17 in FIG. 6: YES), the element construction unit 13 adds the new element $b_2$ to the intermediate layer 2 so that the number of elements included in the intermediate layer 2 is increased (step ST18 in FIG. 6). When the output value $z_1$ of the element $b_1$ included in the intermediate layer 2 is equal to or less than the threshold value Th, it cannot be said that the element $b_1$ included in the intermediate layer 2 is the element corresponding to the output value $y_1$ of the element $a_1$ included in the input layer 1. For this reason, the element construction unit 13 adds the new element $b_2$ to the intermediate layer 2.

In the first embodiment, for convenience of description, the output value $z_1$ of the element $b_1$ included in the intermediate layer 2 is equal to or less than the threshold value Th, so that the new element $b_2$ is added to the intermediate layer 2.

When the element construction unit 13 adds the new element $b_2$ to the intermediate layer 2 or maintains the number J of the elements included in the intermediate layer 2, the initial setting unit 11 determines whether or not all of the M pieces of learning data $x^m=(x_1^m, x_2^m, \ldots, x_I^m)$ have already been acquired (step ST13 in FIG. 6).

When the M pieces of learning data $x^m$ have already been acquired (step ST13 in FIG. 6: YES), the initial setting unit 11 ends the first processing content for determining the structure of the intermediate layer 2.

When the M pieces of learning data $x^m$ have not yet been acquired (step ST13 of FIG. 6: NO), the initial setting unit 11 acquires the learning data $x^m$ that has not yet been acquired (step ST14 of FIG. 6).

In the first embodiment, since the M pieces of learning data $x^m$ have not been acquired at this stage, the initial setting unit 11 acquires second learning data $x^2=(x_1^2, x_2^2, \ldots, x_I^2)$ as the learning data $x^m$ that has not yet been acquired.

When the second learning data $x^2=(x_1^2, x_2^2, \ldots, x_I^2)$ is acquired, the initial setting unit 11 initializes the parameters of the Gaussian function related to the elements $b_1$ and $b_2$ included in the intermediate layer 2 from the output value $y_i = x_i^2$ of the i-th element $a_i$ included in the input layer 1 (step ST15 in FIG. 6).

That is, the initial setting unit 11 calculates the standard deviation value $\sigma_{i,j}$ (i=1, ..., I: j=1, 2) of the Gaussian distribution from the output values $y_i = x_i^2$ of the I elements $a_i$ included in the input layer 1, as one of the parameters of the Gaussian function related to the elements $b_1$ and $b_2$ included in the intermediate layer 2.

In addition, the initial setting unit 11 initializes the output value $y_i = x_i^2$ of the i-th element $a_i$ included in the input layer 1 to the center coordinate $\mu_{i,j}$ (i=1, ..., I: j=1, 2) of the Gaussian function, as one of the parameters of the Gaussian function related to the elements $b_1$ and $b_2$ included in the intermediate layer 2, as indicated in the following expression (4).

$$\mu_{i,j} = x_i^2 \tag{4}$$

Further, the initial setting unit 11 initializes the weight $W_{i,j}$ between the i-th element $a_i$ (i=1, ..., I) included in the input layer 1 and the j-th element $b_j$ (j=1, 2) included in the intermediate layer 2, as one of the parameters of the Gaussian function related to the elements $b_1$ and $b_2$ included in the intermediate layer 2, as indicated in the following expression (5).

$$W_{i,j} = 1 \tag{5}$$

Here, an example is described in which the weight $W_{i,j}$ is set to 1; however, this is merely an example, and a value other than 1 may be set.

When the parameters of the Gaussian function related to the elements $b_1$ and $b_2$ included in the intermediate layer 2 are initialized, the initial setting unit 11 outputs the initial values of the parameters to the output value calculating unit 12, and stores the initial values of the parameters in the data storage unit 14.

The output value calculating unit 12 acquires from the initial setting unit 11 the initial values of the parameters of the Gaussian function related to the elements $b_1$ and $b_2$ included in the intermediate layer 2.

In addition, the output value calculating unit 12 acquires the second learning data $x^2=(x_1^2, x_2^2, \ldots, x_I^2)$.

When the second learning data $x^2$ is acquired, the output value calculating unit 12 calculates the output value $z_1$ of the element $b_1$ included in the intermediate layer 2 (step ST16 in FIG. 6).

That is, the output value calculating unit 12 calculates the output value $z_1$ of the element $b_1$ included in the intermediate layer 2, by substituting the initial values of the parameters of the Gaussian function related to the element $b_1$ included in the intermediate layer 2, and the output values $y_i = x_i^2$ of the I elements $a_i$ included in the input layer 1, to the Gaussian function indicated in the following expression (6).

The initial values of the parameters of the Gaussian function related to the element $b_1$ included in the intermediate layer 2 are the standard deviation value $\sigma_{i,1}$ (i=1, ..., I) of the Gaussian distribution, the center coordinate $\mu_{i,1}$ (i=1, ..., I), and the weight $W_{i,j}$ (i=1, ..., I).

In addition, the output value calculating unit 12 calculates an output value $z_2$ of the element $b_2$ included in the intermediate layer 2, by substituting the initial values of the parameters of the Gaussian function related to the element $b_2$ included in the intermediate layer 2, and the output values $y_i = x_i^2$ of the I elements $a_i$ included in the input layer 1, to the Gaussian function indicated in the following expression (6).

The initial values of the parameters of the Gaussian function related to the element $b_2$ included in the intermediate layer 2 are a standard deviation value $\sigma_{i,2}$ (i=1, ..., I) of the Gaussian distribution, a center coordinate $\mu_{i,2}$ (i=1, ..., I) of the Gaussian function, and a weight $W_{i,j}$ (i=1, ..., I).

$$z_j = \exp\left\{-\sum_{i=1}^{I} \frac{(W_{i,j} y_i - \mu_{i,j})^2}{\sigma_{i,j}^2}\right\} \tag{6}$$

Here, in the expression (6), I=1, ..., I, and j=1, 2.

When the output value $z_1$ of the element $b_1$ and the output value $z_2$ of the element $b_2$ included in the intermediate layer 2 are calculated, the output value calculating unit 12 outputs the output values $z_1$ and $z_2$ of the elements $b_1$ and $b_2$ to the element construction unit 13, and stores the output values $z_1$ and $z_2$ of the elements $b_1$ and $b_2$ in the data storage unit 14.

When the output values $z_1$ and $z_2$ of the elements $b_1$ and $b_2$ are received from the output value calculating unit 12, the element construction unit 13 compares the output values $z_1$ and $z_2$ of the elements $b_1$ and $b_2$ with the threshold value Th (step ST17 in FIG. 6).

When any of the output, values $z_1$ and $z_2$ of the elements $b_1$ and $b_2$ included in the intermediate layer 2 is greater than the thresholdvalue Th (step ST17 in FIG. 6: NO), the element construction unit 13 maintains the number J (J=2) of the elements included in the intermediate layer 2. When any of the output values $z_1$ and $z_2$ of the elements $b_1$ and $b_2$ included in the intermediate layer 2 is greater than the threshold value Th, it can be said that an element whose output value is greater than the threshold value Th is an element corresponding to the output value of an element included in the input layer 1. For this reason, there is no need to add a new element $b_3$ to the intermediate layer 2, so that the element construction unit 13 maintains the number J (J-2) of the elements included in the intermediate layer 2.

When all of the output values $z_1$ and $z_2$ of the elements $b_1$ and $b_2$ included in the intermediate layer 2 are equal to or less than the threshold value Th (step ST17 in FIG. 6: YES), the element construction unit 13 adds the new element $b_3$ to the intermediate layer 2 so that the number of elements included in the intermediate layer 2 is increased (step ST18 in FIG. 6). When all of the output values $z_1$ and $z_2$ of the elements $b_1$ and $b_2$ included in the intermediate layer 2 are equal to or less than the threshold value Th, it cannot be said that any element included in the intermediate layer 2 is an element corresponding to the output value of an element included in the input layer 1. For this reason, the element construction unit 13 adds the new element $b_3$ to the intermediate layer 2.

In the first embodiment, for convenience of description, all of the output values $z_1$ and $z_2$ of the elements $b_1$ and $b_2$ included in the intermediate layer 2 are equal to or less than the threshold value Th, so that the new element $b_3$ is added to the intermediate layer 2.

Hereinafter, description will be made assuming that the number of elements currently included in the intermediate layer 2 is J (J≥3).

When the element construction unit 13 adds a new element to the intermediate layer 2 or maintains the number J of the elements included in the intermediate layer 2, the initial setting unit 11 determines whether or not all of the M pieces of learning data $x^m=(x_1^m, x_2^m, \ldots, x_I^m)$ have already been acquired (step ST13 in FIG. 6).

When the M pieces of learning data $x^m$ have already been acquired (step ST13 in FIG. 6: YES), the initial setting unit 11 ends the first processing content for determining the structure of the intermediate layer 2.

When the M pieces of learning data $x^m$ have not yet been acquired (step ST13 of FIG. 6: NO), the initial setting unit 11 acquires the learning data $x^m$ that has not yet been acquired (step ST14 of FIG. 6).

For example, when the m-th learning data $x^m$ of the M pieces of learning data $x^m$ has not yet been acquired, the initial setting unit 11 acquires the m-th learning data $x^m$.

When the m-th learning data $x^m$ is acquired, the initial setting unit 11 initializes the parameters of the Gaussian function related to the elements $b_1$ to $b_J$ included in the intermediate layer 2, from the output value $y_i = x_i^m$ of the i-th element $a_i$ included in the input layer 1 (step ST15 in FIG. 6).

That is, the initial setting unit 11 calculates the standard deviation value $\sigma_{i,j}$ (i=1, . . . , I: j-1, . . . , J) of the Gaussian distribution from the output values $y_i = x_i^m$ of the I elements $a_i$ included in the input layer 1, as one of the parameters of the Gaussian function related to the elements $b_1$ to $b_J$ included in the intermediate layer 2.

In addition, the initial setting unit 11 initializes the output value $y_i = x_i^m$ of the i-th element $a_i$ included in the input layer 1 to the center coordinate $\mu_{i,j}$ of the Gaussian function, as one of the parameters of the Gaussian function related to the elements $b_1$ to $b_J$ included in the intermediate layer 2, as indicated in the expression (4).

Further, the initial setting unit 11 initializes the weight $W_{i,j}$ between the i-th element $a_i$ (i=1, . . . , J) included in the input layer 1 and the j-th element $b_j$ (j=1, . . . , J) included in the intermediate layer 2, as one of the parameters of the Gaussian function related to the elements $b_1$ to $b_J$ included in the intermediate layer 2, as indicated in the expression (5).

Here, an example is described in which the weight $W_{i,j}$ is set to 1; however, this is merely an example, and a value other than 1 may be set.

When the parameters of the Gaussian function related to the elements $b_1$ to $b_J$ included in the intermediate layer 2 are initialized, the initial setting unit 11 outputs the initial values of the parameters to the output value calculating unit 12, and stores the initial values of the parameters in the data storage unit 14.

The output value calculating unit 12 acquires from the initial setting unit 11 the initial values of the parameters of the Gaussian function related to the elements $b_1$ to $b_J$ included in the intermediate layer 2.

In addition, the output value calculating unit 12 acquires the m-th learning data $x^m=(x_1^m, x_2^m, \ldots, x_I^m)$.

When the m-th learning data $x^m=(x_1^m, x_2^m, \ldots, x_I^m)$ is acquired, the output value calculating unit 12 calculates the output values $z_1$ to $z_J$ of the elements $b_1$ to $b_J$ included in the intermediate layer 2 (step ST16 in FIG. 6).

That is, the output value calculating unit 12 calculates the output value $z_j$ (j=1, . . . , J) of the element $b_j$ included in the intermediate layer 2, by substituting the initial values of the parameters of the Gaussian function related to the element $b_j$ (j=1, . . . , J) included in the intermediate layer 2, and the output values $y_i = x_i^m$ of the I elements $a_i$ included in the input layer 1, to the Gaussian function indicated in the expression (6).

The initial values of the parameters of the Gaussian function related to the element $b_j$ included in the intermediate layer 2 are the standard deviation value $\sigma_{i,j}$ (i=1, . . . , J) of the Gaussian distribution, the center coordinate $\mu_{i,j}$ (i=1, . . . , I: j=1, . . . , J) of the Gaussian function, and the weight $W_{i,j}$ (i=1, . . . , I: j=1, . . . , J).

When the output values $z_1$ to $z_J$ of the elements $b_1$ to $b_J$ included in the intermediate layer 2 are calculated, the output value calculating unit 12 outputs the output values $z_1$ to $z_J$ of the elements $b_1$ to $b_J$ to the element construction unit 13, and stores the output values $z_1$ to $z_J$ of the elements $b_1$ to $b_J$ in the data storage unit 14.

When the output values $z_1$ to $z_J$ of the elements $b_1$ to $b_J$ are received from the output value calculating unit 12, the element construction unit 13 compares the output values $z_1$ to $z_J$ of the elements $b_1$ to $b_J$ with the threshold value Th (step ST17 in FIG. 6).

When any of the output values $z_1$ to $z_J$ of the elements $b_1$ to $b_J$ included in the intermediate layer 2 is greater than the threshold value Th (step ST17 in FIG. 6: NO), the element construction unit 13 maintains the number j of the elements included in the intermediate layer 2.

When all of the output values $z_1$ to $z_J$ of the elements $b_1$ to $b_J$ included in the intermediate layer 2 are equal to or less than the threshold value Th (step ST17 in FIG. 6: YES), the element construction unit 13 adds a new element to the intermediate layer 2 so that the number of elements included in the intermediate layer 2 is increased (step ST18 in FIG. 6).

The processing of steps ST13 to ST18 is repeatedly performed until all of the M pieces of learning data $x^m$ are acquired, and when it is determined to be "YES" in the determination processing of step ST13, the first processing content is ended.

After the first processing content is ended, the parameter updating unit 15 performs the second processing content.

That is, the parameter updating unit 15 updates the parameters of the Gaussian function stored in the data storage unit 14 and the weight $v_j$ between the j-th element $b_j$ included in the intermediate layer 2 and the element c included in the output layer 3, by performing supervised learning for learning the parameters of the Gaussian function stored in the storage unit 14, that is, the parameters of the Gaussian function related to the J elements $b_j$ (j=1, . . . , J) included in the intermediate layer 2, each time the M pieces of learning data $x^m = (x_1^m, x_2^m, \ldots, x_I^m)$ are sequentially given, after the first processing content is ended.

In addition, the parameter updating unit 15 updates the weight $W_{i,j}$ between the i-th element $a_i$ included in the input layer 1 and the j-th element $b_j$ included in the intermediate layer 2 by performing the supervised learning.

Since supervised learning itself is a known technique, a detailed description will be omitted, but for example, supervised learning can be performed by using a known back propagation method.

Note that, the parameter updating unit 15 may update all the parameters in the Gaussian function, but may update only some parameters in the Gaussian function.

For example, a method A can be considered in which out of the standard deviation value $\sigma_{i,j}$ of the Gaussian distribution, the center coordinate $\mu_{i,j}$ of the Gaussian function, and the weight $W_{i,j}$, the center coordinate $\mu_{i,j}$ of the Gaussian function is fixed and the standard deviation value $\sigma_{i,j}$ and the weight $W_{i,j}$ are updated.

In addition, a method B in which the standard deviation value $\sigma_{i,j}$ of the Gaussian distribution is fixed and the center coordinate $\mu_{i,j}$ of the Gaussian function and the weight $W_{i,j}$ are updated, and a method C in which the weight $W_{i,j}$ is fixed and the standard deviation value $\sigma_{i,j}$ of the Gaussian distribution and the center coordinate $\mu_{i,j}$ of the Gaussian function are updated, can be considered.

As is apparent from the above description, according to the first embodiment, the element construction unit 13 compares the output value $z_j$ of one or more elements $b_j$ included in the intermediate layer 2 calculated by the output value calculating unit 12 and the threshold value Th, and maintains the number of elements $b_j$ included in the intermediate layer 2 when any of the output values $z_j$ out of the output values $z_j$ of the one or more elements $b_j$ included in the intermediate layer 2 is greater than the threshold value Th, and increases the number of elements $b_j$ included in the intermediate layer 2 when all of the output values $z_j$ of the one or more elements $b_j$ included in the intermediate layer 2 are equal to or less than the threshold value Th, so that there is an effect that the number of elements $b_j$ included in the intermediate layer 2 of the neural network can be automatically determined even when the element $b_j$ included in the intermediate layer 2 of the neural network is an element whose input/output response is determined by the Gaussian function.

Second Embodiment

In the first embodiment, an example in which the number of intermediate layers 2 included in the neural network is one has been described.

In this second embodiment, an example in which the number of intermediate layers 2 included in the neural network is two or more will be described.

Figure 7:
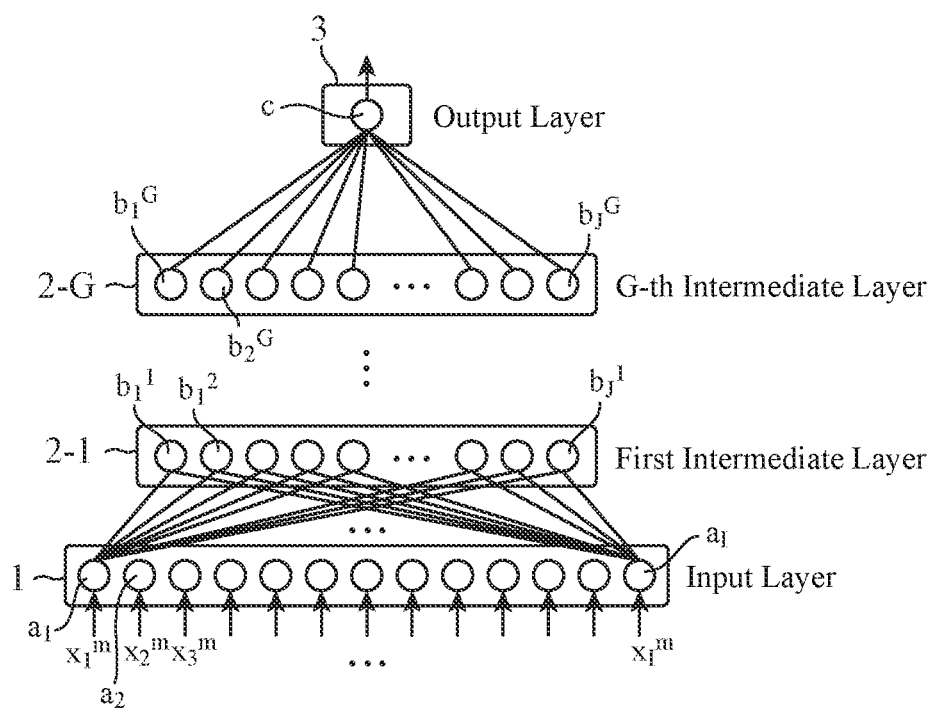
FIG. 7 is an explanatory diagram illustrating an example of a neural network to which a network construction apparatus according to a second embodiment of the present invention is applied.

FIG. 7 is an explanatory diagram illustrating an example of a neural network to which a network construction apparatus according to the second embodiment of the present invention is applied. In FIG. 7, since the same reference numerals as those in FIG. 3 denote the same or corresponding portions, the description thereof will be omitted.

Intermediate layers 2-1 to 2-G are connected in cascade between the input layer 1 and the output layer 3.

The g-th intermediate layer 2-g (g=1, 2, . . . , G) includes J (J is an integer equal to or greater than 1) elements $b_j^g$ (j=1, 2, . . . , J), and the j-th element $b_j^g$ is an element whose input/output response is determined by a Gaussian function.

When the output values $y_i = x_i^m$ of the I elements $a_i$ included in the input layer 1 are given to the j-th element $b_j^1$, similarly to the intermediate layer 2 in FIG. 3, the first intermediate layer 2-1 calculates an output value $z_j^m$ of the j-th element $b_j^m$ from the output values $y_i$ of the I elements $a_i$, and outputs the output value $z_j^m$ of the element $b_j^m$ to the second intermediate layer 2-2.

When the output values $z_j^{g-1}$ of all the elements $b_j^{g-1}$ included in the (g−1)-th intermediate layer 2-(g−1) are given to the j-th element $b_j^{g-1}$, the g-th intermediate layer 2-g (g=2, 3, . . . , G−1) calculates the output value $z_j^g$ of the j-th element $b_j^g$ from the output values $z_j^{g-1}$ of all the elements $b_j^{g-1}$, and outputs the output value $z_j^g$ of the element $b_j^g$ to the G-th intermediate layer 2-G.

When the output values $z_j^{G-1}$ of all the elements $b_j^{G-1}$ included in the (G−1)-th intermediate layer 2-(G−1) are given to the j-th element $b_j^G$, the G-th intermediate layer 2-G calculates the output value $z_j^G$ of the j-th element $b_j^G$ from the output values $z_j^{G-1}$ of all the elements $b_j^{G-1}$, and outputs the output value $z_j^G$ of the element $b_j^G$ to the output layer 3.

In FIG. 7, although the numbers of elements included in the intermediate layers 2-1 to 2-G are all illustrated to be the same as each other, it is needless to say that the numbers of elements included in the intermediate layers 2-1 to 2-G may be determined to be different from each other depending on processing of the element construction unit 13 described later.

Next, the operation will be described.

In the first embodiment, an example has been described in which the structure of the intermediate layer 2 is determined before the supervised learning is performed; however, in the second embodiment, an example will be described in which structures of the intermediate layers 2-1 to 2-G are determined before the supervised learning is performed.

In the second embodiment, the structure of the intermediate layer 2-g is determined in order from the intermediate layer 2-g (g=1, 2, . . . , G) on the input layer 1 side, out of the intermediate layers 2-1 to 2-G.

Figure 8:
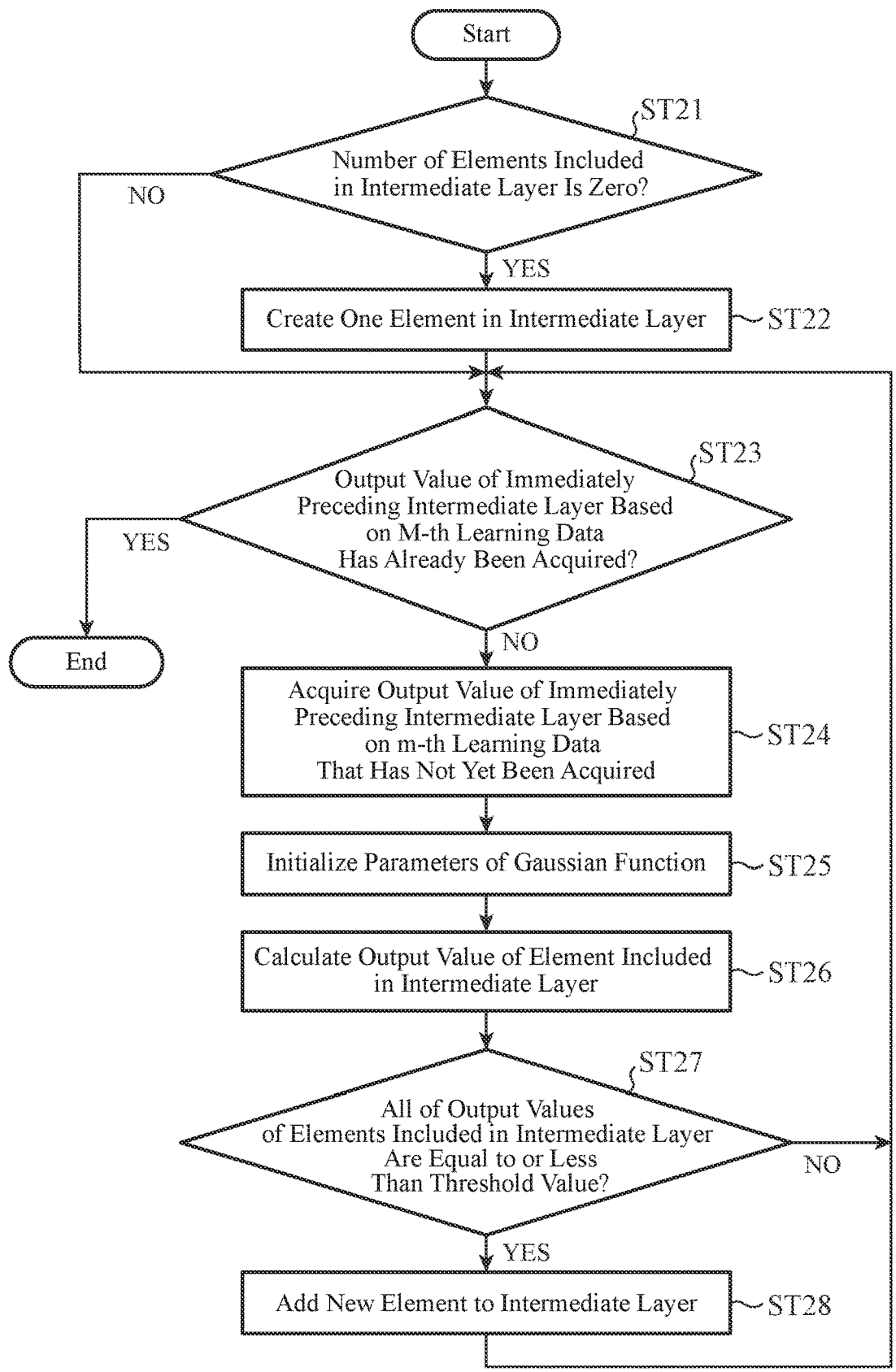

FIG. 8 is a flowchart illustrating a network construction method that is a processing procedure in the case where the network construction apparatus is implemented by software, firmware, or the like.

The processing of determining the structure of the intermediate layer 2-1 on the side closest to the input layer 1 out of the intermediate layers 2-1 to 2-G is the same as the processing of determining the structure of the intermediate layer 2 in FIG. 3, so that the description thereof will be omitted.

Hereinafter, with reference to FIG. 8, processing contents of determining the structure of the intermediate layer 2-g (g=2, 3, . . . , G) will be described.

In the second embodiment, it is assumed that an initial value of the number J of the elements $b_j^g$ included in the intermediate layer 2-$g$ is zero.

In addition, it is assumed that the number J of the elements $b_j^{g-1}$ included in the intermediate layer 2-($g$-1) has already been determined to be K, and the output value $z_k^{g-1}$ of the k-th element $b_k^{g-1}$ (k=1, . . . , K) included in the intermediate layer 2-($g$-1) has been calculated.

In executing the first processing content, the element construction unit 13 determines whether or not the $b_j^g$ is included in the intermediate layer 2-$g$.

That is, the element construction unit 13 determines whether or not the number J of the elements $b_j^g$ included in the intermediate layer 2-$g$ is zero (step ST21 in FIG. 8).

When it is determined that the number J of the elements $b_j^g$ included in the intermediate layer 2-$g$ is zero (step ST21 in FIG. 8: YES), the element construction unit 13 newly adds one $b_j^g$ in the intermediate layer 2-$g$. That is, the element construction unit 13 creates an $b_1^g$ in the intermediate layer 2-$g$ (step ST22 in FIG. 8).

When it is determined that the number J of the elements $b_j^g$ included in the intermediate layer 2-$g$ is not zero (step ST21 in FIG. 8: NO), at this stage, the element construction unit 13 does not perform processing of adding the new $b_j^g$ in the intermediate layer 2-$g$. In the second embodiment, since the initial value of the number J of the elements $b_j^g$ included in the intermediate layer 2-$g$ is set to zero, here, the element construction unit 13 creates the element $b_1^g$ in the intermediate layer 2-$g$.

When the element construction unit 13 creates the $b_1^g$ in the intermediate layer 2-$g$, the initial setting unit 11 determines whether or not the M pieces of learning data $x^m$=($x_1^m$, $x_2^m$, . . . , $x_I^m$) (m=1, . . . , M) have been given to the input layer 1, and output values $z_k^{g-1}$ of the K elements $b_k^{g-1}$ (k=1, . . . , K) included in the immediately preceding intermediate layer 2-($g$-1) based on the M-th learning data $x^M$ have been acquired (step ST23 in FIG. 8).

When the output values $z_k^{g-1}$ of the K elements $b_k^{g-1}$ (k=1, . . . , K) included in the immediately preceding intermediate layer 2-($g$-1) based on the M-th learning data $x^M$ have been acquired (step ST23 in FIG. 8: YES), the initial setting unit 11 ends the first processing content for determining the structure of the intermediate layer 2-$g$.

When the output values $z_k^{g-1}$ of the K elements $b_k^{g-1}$ included in the immediately preceding intermediate layer 2-($g$-1) based on the M-th learning data $x^M$ have not yet been acquired (step ST23 in FIG. 8: NO), the initial setting unit 11 acquires the output values $z_k^{g-1}$ of the K elements $b_k^{g-1}$ included in the immediately preceding intermediate layer 2-($g$-1) that have not yet been acquired (step ST24 in FIG. 8).

In the second embodiment, since the output values $z_k^{g-1}$ of the K elements $b_k^{g-1}$ included in the immediately preceding intermediate layer 2-($g$-1) based on the first learning data $x^1$ have not been acquired at this stage, the initial setting unit 11 acquires the output values $z_k^{g-1}$ of the K elements $b_k^{g-1}$ included in the immediately preceding intermediate layer 2-($g$-1) based on the first learning data $x^1$.

When the output values $z_k^{g-1}$ of the K elements $b_k^{g-1}$ included in the immediately preceding intermediate layer 2-($g$-1) based on the first learning data $x^1$ are acquired, the initial setting unit 11 initializes the parameters of the Gaussian function related to the $b_1^g$ included in the intermediate layer 2-$g$ from the output values $z_k^{g-1}$ of the K elements $b_k^{g-1}$ included in the intermediate layer 2-($g$-1) (step ST25 in FIG. 8).

That is, the initial setting unit 11 calculates a standard deviation value $\sigma_{k,1}^g$ (k=1, . . . , K) of the Gaussian distribution from the output values $z_k^{g-1}$ of the K elements $b_k^{g-1}$ included in the intermediate layer 2-($g$-1), as one of the parameters of the Gaussian function related to the element $b_1^g$ included in the intermediate layer 2-$g$.

In addition, the initial setting unit 11 initializes a center coordinate $\mu_{k,1}^g$ (k=1, . . . , K) of the Gaussian function, as one of the parameters of the Gaussian function related to the $b_1^g$ included in the intermediate layer 2-$g$.

The center coordinate $\mu_{k,1}^g$ of the Gaussian function is the output value $z_k^{g-1}$ of the k-th element $b_k^{g-1}$ included in the intermediate layer 2-($g$-1), as indicated in the following expression (7).

$$\mu_{k,1}^g = z_k^{g-1} \qquad (7)$$

Further, the initial setting unit 11 initializes a weight $W_{k,1}^g$ between the k-th element $b_k^{g-1}$ included in the intermediate layer 2-($g$-1) and the element $b_1^g$ included in the intermediate layer 2-$g$, as one of the parameters of the Gaussian function related to the element $b_1^g$ included in the intermediate layer 2-$g$, as indicated in the following expression (8).

$$W_{k,1}^g = 1 \qquad (8)$$

Here, an example is described in which the weight $W_{k,1}^g$ is set to 1; however, this is merely an example, and a value other than 1 may be set.

When the parameters of the Gaussian function related to the element $b_1^g$ included in the intermediate layer 2-$g$ are initialized, the initial setting unit 11 outputs the initial values of the parameters to the output value calculating unit 12, and stores the initial values of the parameters in the data storage unit 14.

The output value calculating unit 12 acquires from the initial setting unit 11 the initial values of the parameters of the Gaussian function related to the $b_1^g$ included in the intermediate layer 2-$g$.

In addition, the output value calculating unit 12 acquires the output values $z_k^{g-1}$ of the K elements $b_k^{g-1}$ included in the immediately preceding intermediate layer 2-($g$-1) based on the first learning data $x^1$.

When the output values $z_k^{g-1}$ of the K elements $b_k^{g-1}$ included in the immediately preceding intermediate layer 2-($g$-1) based on the first learning data $x^1$ are acquired, the output value calculating unit 12 calculates an output value $z_1^g$ of the element $b_1^g$ included in the intermediate layer 2-$g$ (step ST26 in FIG. 8).

That is, the output value calculating unit 12 calculates the output value $z_1^g$ of the element $b_1^g$ included in the intermediate layer 2-$g$, by substituting the initial values of the parameters of the Gaussian function related to the $b_1^g$ included in the intermediate layer 2-$g$ and the output values $z_k^{g-1}$ of the K elements $b_k^{g-1}$ included in the intermediate layer 2-($g$-1), to the Gaussian function indicated in the following expression (9).

$$z_1^g = \exp\left\{ -\sum_{k=1}^{K} \frac{(W_{k,1}^g z_k^{g-1} - \mu_{k,1}^g)^2}{(\sigma_{k,1}^g)^2} \right\} \qquad (9)$$

When the output value $z_1^g$ of the element $b_1^g$ included in the intermediate layer 2-$g$ is calculated, the output value calculating unit 12 outputs the output value $z_1^g$ of the element $b_1^g$ to the element construction unit 13, and stores the output value $z_1^g$ of the element $b_1^g$ in the data storage unit 14.

When the output value $z_1^g$ of the element $b_1^g$ is received from the output value calculating unit 12, the element construction unit 13 compares the output value $z_1^g$ of the element $b_1^g$ with the preset threshold value Th (step ST27 in FIG. 8).

Since the output value $z_1^g$ of the element $b_1^g$ is 1 at the maximum, as the threshold value Th, a positive real number equal to or less than 1, or a positive real number equal to or greater than $e^{-0.25}$ and equal to or less than 1 is conceivable.

When the output value $z_1^g$ of the element $b_1^g$ included in the intermediate layer 2-$g$ is greater than the threshold value Th (step ST27 of FIG. 8: NO), the element construction unit 13 maintains the number J (J=1) of the elements included in the intermediate layer 2-$g$.

When the output value $z_1^g$ of the element $b_1^g$ included in the intermediate layer 2-$g$ is equal to or less than the threshold value Th (step ST27 in FIG. 8: YES), the element construction unit 13 adds a new element $b_2^g$ to the intermediate layer 2-$g$ so that the number of elements included in the intermediate layer 2-$g$ is increased (step ST28 in FIG. 8).

In the second embodiment, for convenience of description, the output value $z_1^g$ of the element $b_1^g$ included in the intermediate layer 2-$g$ is equal to or less than the threshold value Th, so that the new element $b_2^g$ is added to the intermediate layer 2-$g$.

When the element construction unit 13 adds the new element $b_2^g$ to the intermediate layer 2-$g$ or maintains the number J of the elements included in the intermediate layer 2-$g$, the initial setting unit 11 determines whether or not the output values $z_k^{g-1}$ of the K elements $b_k^{g-1}$ (k=1, ..., K) included in the immediately preceding intermediate layer 2-($g$-1) based on the M-th learning data $x^M$ have already been acquired (step ST23 in FIG. 8).

When the output values $z_k^{g-1}$ of the K elements $b_k^{g-1}$ (k=1, ..., K) included in the immediately preceding intermediate layer 2-($g$-1) based on the M-th learning data $x^m$ have already been acquired (step ST23 in FIG. 8: YES), the initial setting unit 11 ends the first processing content for determining the structure of the intermediate layer 2.

When the output values $z_k^{g-1}$ of the K elements $b_k^{g-1}$ (k=1, ..., K) included in the immediately preceding intermediate layer 2-($g$-1) based on the M-th learning data $x^M$ have not yet been acquired (step ST23 of FIG. 8: NO), the initial setting unit 11 acquires the output values $z_k^{g-1}$ of the K elements $b_k^{g-1}$ (k=1, ..., K) included in the immediately preceding intermediate layer 2-($g$-1) that have not yet been acquired (step ST24 in FIG. 8).

In the second embodiment, since the output values $z_k^{g-1}$ of the K elements $b_k^{g-1}$ (k=1, ..., K) included in the intermediately preceding layer 2-($g$-1) based on the second learning data $x^2$ have not been acquired at this stage, the initial setting unit 11 acquires the output values $z_k^{g-1}$ of the K elements $b_k^{g-1}$ (k=1, ..., K) included in the intermediately preceding intermediate layer 2-($g$-1) based on the second learning data $x^2$.

When the output values $z_k^{g-1}$ of the K elements $b_k^{g-1}$ (k=1, ..., K) included in the intermediately preceding layer 2-($g$-1) based on the second learning data $x^2$ are acquired, the initial setting unit 11 initializes the parameters of the Gaussian function related to the elements $b_1^g$ and $b_2^g$ included in the intermediate layer 2-$g$ from the output values $z_k^{g-1}$ of the K elements $b_k^{g-1}$ (k=1, ..., K) included in the intermediately preceding layer 2-($g$-1) based on the second learning data $x^2$ (step ST25 in FIG. 8).

That is, the initial setting unit 11 calculates a standard deviation value $\sigma_{k,j}^g$ (k=1, ..., K: j=1, 2) of the Gaussian distribution from the output values $z_k^{g-1}$ of the K elements $b_k^{g-1}$ included in the intermediate layer 2-($g$-1), as one of the parameters of the Gaussian function related to the elements $b_1^g$ and $b_2^g$ included in the intermediate layer 2-$g$.

In addition, the initial setting unit 11 initializes the output value $z_k^{g-1}$ of the k-th element $b_k^{g-1}$ included in the intermediate layer 2-($g$-1) to a center coordinate $\mu_{k,j}^g$ (k=1, ..., K: j=1, 2) of the Gaussian function, as one of the parameters of the Gaussian function related to the elements $b_1^g$ and $b_2^g$ included in the intermediate layer 2-$g$, as indicated in the following expression (10).

$$\mu_{k,j}^g = z_k^{g-1} \tag{10}$$

Further, the initial setting unit 11 initializes a weight $W_{k,j}^g$ (k=1, ..., K: j=1, 2) between the k-th element $b_k^{g-1}$ included in the intermediate layer 2-($g$-1) and the j-th element $b_j^g$ (j=1, 2) included in the intermediate layer 2-$g$, as one of the parameters of the Gaussian function related to the elements $b_1^g$ and $b_2^g$ included in the intermediate layer 2-$g$, as indicated in the following expression (11).

$$W_{k,j}^g = 1 \tag{11}$$

Here, an example is described in which the $W_{k,j}^g$ is set to 1; however, this is merely an example, and a value other than 1 may be set.

When the parameters of the Gaussian function related to the elements $b_1^g$ and $b_2^g$ included in the intermediate layer 2-$g$ are initialized, the initial setting unit 11 outputs the initial values of the parameters to the output value calculating unit 12, and stores the initial values of the parameters in the data storage unit 14.

The output value calculating unit 12 acquires from the initial setting unit 11 the initial values of the parameters of the Gaussian function related to the elements $b_1^g$ and $b_2^g$ included in the intermediate layer 2-$g$.

In addition, the output value calculating unit 12 acquires the output values $z_k^{g-1}$ of the K elements $b_k^{g-1}$ included in the immediately preceding intermediate layer 2-($g$-1) based on the second learning data $x^2$.

When the output values $z_k^{g-1}$ of the K elements $b_k^{g-1}$ included in the immediately preceding intermediate layer 2-($g$-1) based on the second learning data $x^2$ are acquired, the output value calculating unit 12 calculates the output value $z_1^g$ of the element $b_1^g$ and an output value $z_2^g$ of the element beg included in the intermediate layer 2-$g$ (step ST26 in FIG. 8).

That is, the output value calculating unit 12 calculates the output value $z_1^g$ of the element $b_1^g$ included in the intermediate layer 2-$g$, by substituting the initial values of the parameters of the Gaussian function related to the $b_1^g$ included in the intermediate layer 2-$g$ and the output values $z_k^{g-1}$ of the K elements $b_k^{g-1}$ included in the intermediate layer 2-($g$-1), to the Gaussian function indicated in the following expression (12).

The initial values of the parameters of the Gaussian function related to the element $b_1^g$ included in the intermediate layer 2-$g$ are the standard deviation value $\sigma_{k,1}^g$ (k=1, ..., K) of the Gaussian distribution, the center coordinate $\mu_{k,1}^g$ (k=1, ..., K) of the Gaussian function, and the weight $W_{k,1}^g$ (k=1, ..., K).

In addition, the output value calculating unit 12 calculates the output value $z_2^g$ of the element $b_2^g$ included in the intermediate layer 2-$g$, by substituting the initial values of the parameters of the Gaussian function related to the element $b_2^g$ included in the intermediate layer 2-$g$ and the output values $z_k^{g-1}$ of the K elements $b_k^{g-1}$ included in the intermediate layer 2-($g$-1), to the Gaussian function indicated in the following expression (12).

The initial values of the parameters of the Gaussian function related to the element $b_2^g$ included in the intermediate layer $2$-$g$ are a standard deviation value $\sigma_{k,2}^g$ ($k=1, \ldots, K$) of the Gaussian distribution, a center coordinate $\mu_{k,2}^g$ ($k=1, \ldots, K$) of the Gaussian function, and a weight $W_{k,2}^g$ ($k=1, \ldots, K$).

$$z_j^g = \exp\left\{-\sum_{k=1}^{K} \frac{(W_{k,j}^g z_k^{g-1} - \mu_{k,j}^g)^2}{(\sigma_{k,j}^g)^2}\right\} \quad (12)$$

Here, $j=1, 2$ in the expression (12).

When the output value $z_1^g$ of the element $b_1^g$ and the output value $z_2^g$ of the element $b_2^g$ included in the intermediate layer $2$-$g$ are calculated, the output value calculating unit 12 outputs the output values $z_1^g$ and $z_2^g$ of the elements $b_1^g$ and $b_2^g$ to the element construction unit 13, and stores the output values $z_1^g$ and $z_2^g$ of the elements $b_1^g$ and $b_2^g$ in the data storage unit 14.

When the output values $z_1^g$ and $z_2^g$ of the elements $b_1^g$ and $b_2^g$ included from the output value calculating unit 12, the element construction unit 13 compares the output values $z_1^g$ and $z_2^g$ of the elements $b_1^g$ and $b_2^g$ with the threshold value Th (step ST27 in FIG. 8).

When any of the output values $z_1^g$ and $z_2^g$ of the elements $b_1^g$ and $b_2^g$ included in the intermediate layer $2$-$g$ is greater than the threshold value Th (step ST27 in FIG. 8: NO), the element construction unit 13 maintains the number J (J=2) of the elements included in the intermediate layer $2$-$g$.

When all of the output values $z_1^g$ and $z_2^g$ of the elements $b_1^g$ and $b_2^g$ included in the intermediate layer $2$-$g$ are equal to or less than the threshold value Th (step ST27 in FIG. 8: YES), the element construction unit 13 adds a new element $b_3^g$ to the intermediate layer $2$-$g$ so that the number of elements included in the intermediate layer $2$-$g$ is increased (step ST28 in FIG. 8).

In the second embodiment, for convenience of description, all of the output values $z_1^g$ and $z_2^g$ of the elements $b_1^g$ and beg included in the intermediate layer $2$-$g$ are equal to or less than the threshold value Th, so that the new element $b_3^g$ is added to the intermediate layer 2.

Hereinafter, description will be made assuming that the number of elements currently included in the intermediate layer $2$-$g$ is J (J≥3).

When the element construction unit 13 adds a new element to the intermediate layer $2$-$g$ or maintains the number J of the elements included in the intermediate layer $2$-$g$, the initial setting unit 11 determines whether or not the output values $z_k^{g-1}$ of the K elements $b_k^{g-1}$ ($k=1, \ldots, K$) included in the immediately preceding intermediate layer $2$-($g$-1) based on the M-th learning data $x^M$ have already been acquired (step ST23 in FIG. 8).

When the output values $z_k^{g-1}$ of the K elements $b_k^{g-1}$ ($k=1, \ldots, K$) included in the immediately preceding intermediate layer $2$-($g$-1) based on the M-th learning data $x^M$ have already been acquired (step ST23 in FIG. 8: YES), the initial setting unit 11 ends the first processing content for determining the structure of the intermediate layer 2.

When the output values $z_k^{g-1}$ of the K elements $b_k^{g-1}$ ($k=1, \ldots, K$) included in the immediately preceding intermediate layer $2$-($g$-1) based on the M-th learning data $x^m$ have not yet been acquired (step ST23 of FIG. 8: NO), the initial setting unit 11 acquires the output value $z_k^{g-1}$ of the K elements $b_k^{g-1}$ ($k=1, \ldots, K$) included in the immediately preceding intermediate layer $2$-($g$-1) that have not yet been acquired (step ST24 in FIG. 8).

In the second embodiment, since the output values $z_k^{g-1}$ of the K elements $b_k^{g-1}$ ($k=1, \ldots, K$) included in the immediately preceding intermediate layer $2$-($g$-1) based on the m-th learning data $x^m$ out of the M pieces of learning data have not been acquired at this stage, the initial setting unit 11 acquires the output value $z_k^{g-1}$ of the K elements $b_k^{g-1}$ ($k=1, \ldots, K$) included in the immediately preceding intermediate layer $2$-($g$-1) based on the m-th learning data $x^m$.

When the output values $z_k^{g-1}$ of the K elements $b_k^{g-1}$ ($k=1, \ldots, K$) included in the immediately preceding intermediate layer $2$-($g$-1) based on the m-th learning data $x^m$ are acquired, the initial setting unit 11 initializes the parameters of the Gaussian function related to the elements $b_1^g$ to $b_j^g$ included in the intermediate layer $2$-$g$ from the output values $z_k^{g-1}$ of the K elements $b_k^{g-1}$ ($k=1, \ldots, K$) included in the immediately preceding intermediate layer $2$-($g$-1) based on the m-th learning data $x^m$ (step ST25 in FIG. 8).

That is, the initial setting unit 11 calculates the standard deviation value $\sigma_{kj}^g$ ($k=1, \ldots, K: j=1, \ldots, J$) of the Gaussian distribution from the output values $z_k^{g-1}$ of the K elements $b_k^{g-1}$ included in the intermediate layer $2$-($g$-1), as one of the parameters of the Gaussian function related to the elements $b_1^g$ to $b_j^g$ included in the intermediate layer $2$-$g$.

In addition, the initial setting unit 11 initializes the output value $z_k^{g-1}$ of the k-th element $b_k^{g-1}$ included in the intermediate layer $2$-($g$-1) to the center coordinate $\mu_{kj}^g$ ($k=K: j=1, \ldots, J$) of the Gaussian function, as one of the parameters of the Gaussian function related to the elements $b_1^g$ to $b_j^g$ included in the intermediate layer $2$-$g$, as indicated in the expression (10).

Further, the initial setting unit 11 initializes the weight $W_{kj}^g$ ($k=1, \ldots, K: j=1, \ldots, J$) between the k-th element $b_k^{g-1}$ included in the intermediate layer $2$-($g$-1) and the j-th element $b_j g$ ($j=1, \ldots, J$) included in the intermediate layer $2$-$g$, as one of the parameters of the Gaussian function related to the elements $b_1^g$ to $b_j^g$ included in the intermediate layer $2$-$g$, as indicated in the expression (11).

Here, an example is described in which the $W_{kj}^g$ is set to 1; however, this is merely an example, and a value other than 1 may be set.

When the parameters of the Gaussian function related to the elements $b_1^g$ to $b_j^g$ included in the intermediate layer $2$-$g$ are initialized, the initial setting unit 11 outputs the initial values of the parameters to the output value calculating unit 12, and stores the initial values of the parameters in the data storage unit 14.

The output value calculating unit 12 acquires from the initial setting unit 11 the initial values of the parameters of the Gaussian function related to the elements $b_1^g$ to $b_j^g$ included in the intermediate layer 2.

In addition, the output value calculating unit 12 acquires the output values $z_k^{g-1}$ of the K elements $b_k^{g-1}$ included in the immediately preceding intermediate layer $2$-($g$-1) based on the m-th learning data $x^m$.

When the output values $z_k^{g-1}$ of the K elements $b_k^{g-1}$ included in the immediately preceding intermediate layer $2$-($g$-1) based on the m-th learning data $x^m$ are acquired, the output value calculating unit 12 calculates the output values $z_1^g$ to $z_j^g$ of the elements $b_1^g$ to $b_j^g$ included in the intermediate layer $2$-$g$ (step ST26 in FIG. 8).

That is, the output value calculating unit 12 calculates the output value $z_j^g$ ($j=1, \ldots, J$) of the $b_j^g$ included in the intermediate layer $2$-$g$, by substituting the initial values of the parameters of the Gaussian function related to the $b_j^g$ (j=1, . . . , J) included in the intermediate layer 2-g and the output values $z_k^{g-1}$ of the K elements $b_k^{g-1}$ included in the intermediate layer 2-(g−1), to the Gaussian function indicated in the expression (12).

The initial values of the parameters of the Gaussian function related to the $b_j^g$ included in the intermediate layer 2-g are the standard deviation value $\sigma_{k,j}^g$ (k=1, . . . , K: j=1, . . . , J) of the Gaussian distribution, the center coordinate $\mu_{k,j}^g$ (k=1, . . . , K: j=1, . . . , J) of the Gaussian function, and the weight $W_{k,j}^g$ (k=1, . . . , K: j=1, . . . , J).

When the output values $z_1^g$ to $z_J^g$ of the elements $b_1^g$ to $b_J^g$ included in the intermediate layer 2-g are calculated, the output value calculating unit 12 outputs the output values $z_1^g$ to $z_J^g$ of the elements $b_1^g$ to $b_J^g$ to the element construction unit 13, and stores the output values $z_1^g$ to $z_J^g$ of the elements $b_1^g$ to $b_J^g$ in the data storage unit 14.

When the output values $z_1^g$ to $z_J^g$ of the elements $b_1^g$ to $b_J^g$ are received from the output value calculating unit 12, the element construction unit 13 compares the output values $z_1^g$ to $z_J^g$ of the elements $b_1^g$ to $b_J^g$ with the threshold value Th (step ST27 in FIG. 8).

When any of the output values $z_1^g$ to $z_J^g$ of the elements $b_1^g$ to $b_J^g$ included in the intermediate layer 2-g is greater than the threshold value Th (step ST27 in FIG. 8: NO), the element construction unit 13 maintains the number J of the elements included in the intermediate layer 2-g.

When all of the output values $z_1^g$ to $z_J^g$ of the elements $b_1^g$ to $b_J^g$ included in the intermediate layer 2-g are equal to or less than the threshold value Th (step ST27 in FIG. 8: YES), the element construction unit 13 adds a new element to the intermediate layer 2-g so that the number of elements included in the intermediate layer 2-g is increased (step ST28 in FIG. 8).

The processing of steps ST23 to ST28 is repeatedly performed until the output values $z_k^{g-1}$ of the K element $b_k^{g-1}$ (k=1, . . . , K) included in the immediately preceding intermediate layer 2-(g−1) based on the M pieces of learning data $x^m$ (m=1, . . . , M) are acquired, and when it is determined to be "YES" in the determination processing of step ST23, the first processing content is ended.

After the first processing content is ended, the parameter updating unit 15 performs the second processing content.

That is, as in the first embodiment, the parameter updating unit 15 updates the parameters of the Gaussian function stored in the data storage unit 14, and updates the weight $v_j$ between the j-th element $b_j^g$ included in the intermediate layer 2-G and the element c included in the output layer 3, by performing supervised learning for learning the parameters of the Gaussian function related to the elements included in the intermediate layers 2-1 to 2-G, each time the M pieces of learning data $x^m$−$(x_1^m, x_2^m, . . . , x_I^m)$ are sequentially given, after the structures of the intermediate layers 2-1 to 2-G are determined.

In addition, the parameter updating unit 15 updates a weight $W_{i,j}^1$ between the i-th element $a_i$ included in the input layer 1 and the j-th element $b_j^1$ included in the intermediate layer 2-1, and the weight $W_{k,j}^g$ between the k-th element $b_k^{g-1}$ (k=1, . . . , K) included in the intermediate layer 2-(g−1) and the j-th $b_j^g$ (j=1, . . . , J) included in the intermediate layer 2-g, by performing the supervised learning.

That is, by performing the supervised learning for learning the parameters of the Gaussian function related to the elements included in the intermediate layers 2-1 to 2-G, the parameters of the Gaussian function stored in the data storage unit 14 and the weights are updated.

As is apparent from the above description, according to the second embodiment, there is an effect that the number of elements $b_j^g$ included in the intermediate layer 2-g of the neural network can be automatically determined even when the neural network includes two or more intermediate layers 2-g.

Third Embodiment

In the second embodiment, an example has been described in which the number of intermediate layers 2-g included in the neural network is fixed to G.

In this third embodiment, an example in which the number of intermediate layers 2-g included in the neural network is determined as needed will be described.

Figure 9:
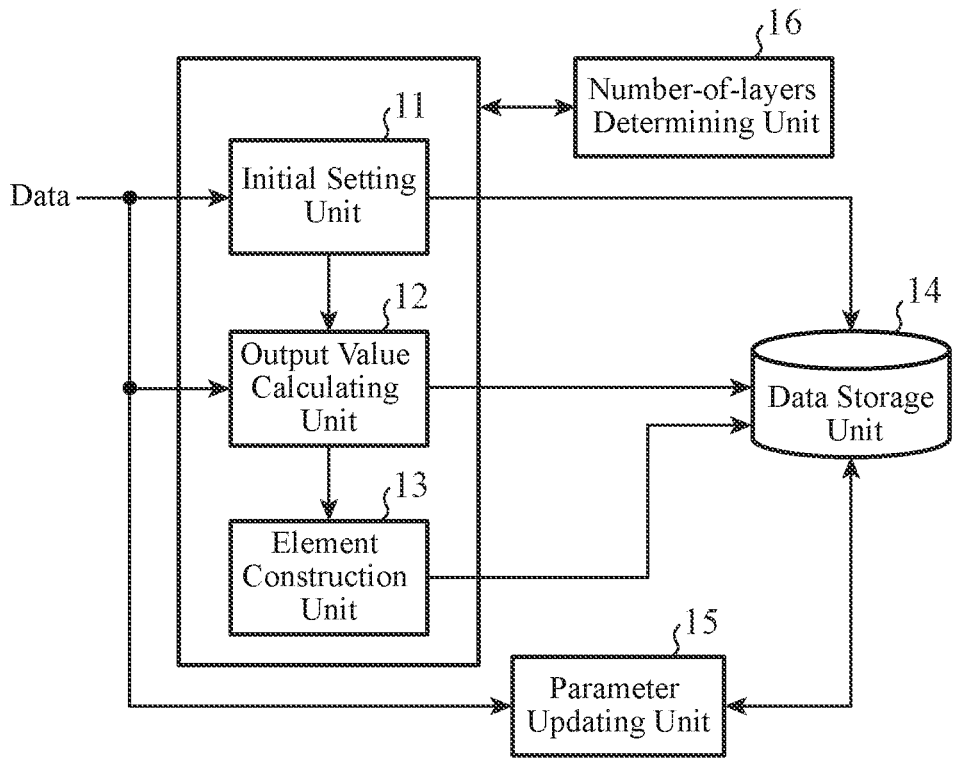
FIG. 9 is a configuration diagram illustrating a network construction apparatus according to a third embodiment of the present invention.
Figure 10:
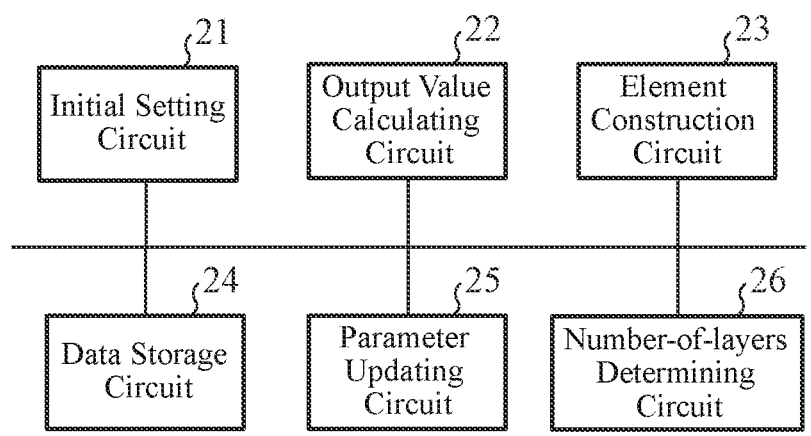
FIG. 10 is a hardware configuration diagram of the network construction apparatus according to the third embodiment of the present invention.

FIG. 9 is a configuration diagram illustrating a network construction apparatus according to the third embodiment of the present invention, and FIG. 10 is a hardware configuration diagram of the network construction apparatus according to the third embodiment of the present invention.

In FIGS. 9 and 10, since the same reference numerals as those in FIGS. 1, and 2 denote the same or corresponding portions, the description thereof will be omitted.

A number-of-layers determining unit 16 is implemented by, for example, a number-of-layers determining circuit 26 in FIG. 10, and performs processing of determining the number G of the intermediate layers 2-g included in the neural network.

In FIG. 9, a network construction apparatus is assumed that the initial setting unit 11, the output value calculating unit 12, the element construction unit 13, the data storage unit 14, the parameter updating unit 15, and the number-of-layers determining unit 16 that are components of the network construction apparatus are respectively implemented by dedicated hardware circuits, which are the initial setting circuit 21, the output value calculating circuit 22, the element construction circuit 23, the data storage circuit 24, the parameter updating circuit 25, and the number-of-layers determining circuit 26, as illustrated in FIG. 10.

Here, examples of the data storage circuit 24 include a nonvolatile or volatile semiconductor memory such as RAM, ROM, flash memory, EPROM, and EEPROM; a magnetic disk, a flexible disk, an optical disc, a compact disc, a mini disc, a DVD, and the like.

In addition, examples of the initial setting circuit 21, the output value calculating circuit 22, the element construction circuit 23, the parameter updating circuit 25, and the number-of-layers determining circuit 26 include a single circuit, a composite circuit, a programmed processor, a parallel-programmed processor, an ASIC, an FPGA, or a combination thereof.

However, the components of the network construction apparatus are not limited to those implemented by dedicated hardware, and the network construction apparatus may be implemented by software, firmware, or a combination of software and firmware.

In the case where the network construction apparatus is implemented by software, firmware, or the like, it is sufficient that the data storage unit 14 is configured on the memory 31 of the computer illustrated in FIG. 4, and a program for causing the computer to execute processing procedures of the initial setting unit 11, the output value calculating unit 12, the element construction unit 13, the parameter updating unit 15, and the number-of-layers determining unit 16 is stored in the memory 31, and the processor 32 of the computer illustrated in FIG. 4 executes the program stored in the memory 31.

In addition, FIG. 10 illustrates an example in which each of the components of the network construction apparatus is implemented by dedicated hardware, and FIG. 4 illustrates an example in which the network construction apparatus is implemented by software, firmware, or the like; however, some components of the construction apparatus may be implemented by dedicated hardware and the remaining components may be implemented by software, firmware, or the like.

Next, the operation will be described.

Since the operation is the same as that of the second embodiment except that the number-of-layers determining unit 16 is implemented, only a processing content of the number-of-layers determining unit 16 will be described here.

When the initial setting unit 11, the output value calculating unit 12, and the element construction unit 13 determine a structure of one intermediate layer 2-g in the same manner as in the second embodiment, the number-of-layers determining unit 16 connects the intermediate layer 2-g whose structure has been determined between the input layer 1 and the output layer 3, at each time of the determination.

For example, at a stage where the determination is completed of structures of three intermediate layers 2-1 to 2-3, the three intermediate layers 2-1 to 2-3 are connected between the input layer 1 and the output layer 3.

In addition, at a stage where the determination is completed of structures of four intermediate layers 2-1 to 2-4, the four intermediate layers 2-1 to 2-4 are connected between the input layer 1 and the output layer 3.

When an intermediate layer 2-g whose structure is newly determined is connected between the input layer 1 and the output layer 3, the number-of-layers determining unit 16 gives arbitrary data to the input layer 1.

Then, the number-of-layers determining unit 16 measures a time from when data is given to the input layer 1 until data is output from the output layer 3, as an input/output time Ta of data in the neural network.

$$Ta = T_{OUT} - T_{IN} \quad (13)$$

In the expression (13), $T_{IN}$ is a time when data is input to the input layer 1, and $T_{OUT}$ is a time when data is output from the output layer 3.

When the input/output time Ta of the data in the neural network is measured, the number-of-layers determining unit 16 compares the input/output time Ta with an allowable time Tb of the input/output time.

The allowable time Tb of the input/output time is a time allowed by the network construction apparatus, and is a time set in advance.

In a case where the input/output time Ta of the data in the neural network is shorter than the allowable time Tb of the input/output time, the number-of-layers determining unit 16 calculates, from the input/output time Ta of the data, an input/output time Ta/E of the intermediate layer 2-g per layer connected between the input layer 1 and the output layer 3.

E is the number of the intermediate layers 2-g connected between the input layer 1 and the output layer 3 at the present moment.

In a case where the following expression (14) is satisfied, it is highly likely that the input/output time Ta of the data in the neural network will be within the allowable time Tb even when the number of intermediate layers 2-g connected between the input layer 1 and the output layer 3 is increased by one, so that the number-of-layers determining unit 16 permits to increase by one the number of the intermediate layers 2-g connected between the input layer 1 and the output layer 3.

Thus, the initial setting unit 11, the output value calculating unit 12, and the element construction unit 13 perform processing of determining a structure of a newly added intermediate layer 2-g in the same manner as in the second embodiment.

$$Tb > Ta + Ta/E \quad (14)$$

In a case where the expression (14) is not satisfied, when the number of intermediate layers 2-g connected between the input layer 1 and the output layer 3 is increased by one, it is highly likely that the input/output time Ta of the data in the neural network will exceed the allowable time Tb, so that the number-of-layers determining unit 16 refuses to increase the number of intermediate layers 2-g connected between the input layer 1 and the output layer 3.

Thus, the number E of the intermediate layers 2-g connected between the input layer 1 and the output layer 3 is determined as the number G of the intermediate layers 2-g of the neural network at the present moment.

As is apparent from the above description, according to the third embodiment, the number-of-layers determining unit 16 determines the number G of the intermediate layer 2-g from the input/output time Ta of the data in the neural network and the allowable time Tb of the input/output time, so that there is an effect that the input/output time Ta of the data in the neural network can be set within the allowable time Tb.

In the third embodiment, an example has been described in which the number-of-layers determining unit 16 measures the input/output time Ta of the data in the neural network and determines the number G of the intermediate layers 2 from the input/output time Ta and the allowable time Tb; however, this is not a limitation.

For example, the number-of-layers determining unit 16 may measure a learning time Tc of the neural network, and determine the number G of the intermediate layers 2 from the learning time Tc and an allowable time Td of the learning time.

Specifically, it is as follows.

When the intermediate layer 2-g whose structure is newly determined is connected between the input layer 1 and the output layer 3, the number-of-layers determining unit 16 causes the neural network to perform learning by giving learning data to the input layer 1.

Then, for example, the number-of-layers determining unit 16 measures a time from when learning data is given to the input layer 1 until data is output from the output layer 3, as the learning time Tc of the neural network.

$$Tc = T_{OUT} - T_{IN} \quad (15)$$

In the expression (15), $T_{IN}$ is a time when learning data is input to the input layer 1, and $T_{OUT}$ is a time when data is output from the output layer 3.

When the learning time Tc of the neural network is measured, the number-of-layers determining unit 16 compares the learning time Tc with the allowable time Td of the learning time.

The allowable time Td of the learning time is a time allowed by the network construction apparatus, and is a time set in advance.

In a case where the learning time Tc of the neural network is shorter than the allowable time Td of the learning time, the number-of-layers determining unit 16 calculates, from the learning time Tc of the neural network, a learning time Tc/E of the intermediate layer 2-*g* per layer connected between the input layer 1 and the output layer 3.

E is the number of the intermediate layers 2-*g* connected between the input layer 1 and the output layer 3 at the present moment.

In a case where the following expression (16) is satisfied, it is highly likely that the learning time Tc of the neural network will be within the allowable time Td even when the number of intermediate layers 2-*g* connected between the input layer 1 and the output layer 3 is increased by one, so that the number-of-layers determining unit 16 permits to increase by one the number of the intermediate layers 2-*g* connected between the input layer 1 and the output layer 3.

Thus, the initial setting unit 11, the output value calculating unit 12, and the element construction unit 13 perform processing of determining a structure of a newly added intermediate layer 2-*g* in the same manner as in the second embodiment.

$$Td > Tc + Tc/E \qquad (16)$$

In a case where the expression (16) is not satisfied, when the number of intermediate layers 2-*g* connected between the input layer 1 and the output layer 3 is increased by one, it is highly likely that the learning time Tc of the neural network will exceed the allowable time Td, so that the number-of-layers determining unit 16 refuses to increase the number of intermediate layers 2-*g* connected between the input layer 1 and the output layer 3.

Thus, the number E of the intermediate layers 2-*g* connected between the input layer 1 and the output layer 3 is determined as the number G of the intermediate layers 2-*g* of the neural network at the present moment.

In a case where the number-of-layers determining unit 16 measures the learning time Tc of the neural network and determines the number G of the intermediate layers 2 from the learning time Tc and the allowable time Td, there is an effect that the learning time Tc of the neural network can be set within the allowable time Td.

Note that, in the invention of the present application, within the scope of the invention, free combination of each embodiment, a modification of an arbitrary component of each embodiment, or omission of an arbitrary component in each embodiment is possible.

INDUSTRIAL APPLICABILITY

The present invention is suitable for a network construction apparatus and a network construction method for constructing a neural network.

REFERENCE SIGNS LIST

1 Input layer
2, 2-1 to 2-G Intermediate layer
3 Output layer
11 Initial setting unit
12 Output value calculating unit
13 Element construction unit
14 Data storage unit
15 Parameter updating unit
16 Number-of-layers determining unit
21 Initial setting circuit
22 Output value calculating circuit
23 Element construction circuit
24 Data storage circuit
25 Parameter updating circuit
26 Number-of-layers determining circuit
31 Memory
32 Processor

The invention claimed is:

1. A network construction apparatus for constructing a neural network having an input layer, one or more intermediate layers having a number of respective elements, and an output layer, where the input/output response of the respective elements of one or more intermediate layers is determined by a Gaussian function, comprising:
   a processor; and
   a memory storing instructions, upon executed by the processor, causing the processor to
      perform an element construction process to determine a structure of the one or more intermediate layers, the element construction processing including processes to:
         determine whether the one or more intermediate layers include at least one element and adding an element to the one or more intermediate layers in response to a determination that non elements currently exist;
         initialize, for each element included in an intermediate layer, parameters of a Gaussian function related to the element when the neural network is constructed, the neural network including the intermediate layer including an element whose input/output response is determined by the Gaussian function;
         calculate output values of one or more elements included in the intermediate layer in accordance with the initialized parameters and an output value of an element included in the input layer of the neural network;
         compare the calculated output values of the one or more elements with a threshold value, and maintaining a number of elements included in the intermediate layer when an output value of any of the elements out of the output values of the one or more elements included in the intermediate layer is greater than the threshold value, and performing element construction processing of increasing the number of elements included in the intermediate layer when all of the output values of the one or more elements included in the intermediate layer are equal to or less than the threshold value; and
         repeat the element construction processes until all pieces of learning data have been acquired; and
      perform a training process of updating the parameters of the Gaussian function and updating a weight between an element included in the one or more intermediate layers and an element included in the output layer, by performing supervised learning to learn the parameters of the Gaussian function when learning data is given to the input layer after the element construction processing is completed.

2. The network construction apparatus according to claim 1, wherein the element construction process calculates an output value of each element included in the intermediate layer by assigning an output value of an element included in the input layer to the Gaussian function having the initialized parameters.

3. The network construction apparatus according to claim 1, wherein the training process updates a weight between an element included in the input layer and an element included in the intermediate layer by performing the supervised learning.

4. The network construction apparatus according to claim 2, wherein the element construction process uses a standard deviation value of a Gaussian distribution in the Gaussian function for individual elements included in the intermediate layer, as one of the parameters of the Gaussian function.

5. The network construction apparatus according to claim 4, wherein the element construction process uses a standard deviation value of output values of a plurality of the elements included in the input layer, as the standard deviation value of the Gaussian distribution for the individual elements included in the intermediate layer.

6. The network construction apparatus according to claim 4, wherein the element construction process uses a positive real number as the standard deviation value of the Gaussian distribution for the individual elements included in the intermediate layer.

7. The network construction apparatus according to claim 1, wherein the element construction process uses a positive real number equal to or less than 1, as the threshold value.

8. The network construction apparatus according to claim 1, wherein the element construction process uses a positive real number equal to or greater than e-0.25 and equal to or less than 1, as the threshold value.

9. The network construction apparatus according to claim 1, wherein the training process updates any one or more parameters out of a parameter indicating the standard deviation value of the Gaussian distribution in the Gaussian function and a parameter indicating a center coordinate of the Gaussian function, as the parameters of the Gaussian function.

10. The network construction apparatus according to claim 1, wherein
the neural network includes G intermediate layers, where G is an integer equal to or greater than 2, and the G intermediate layers are connected in cascade between the input layer and an output layer,
the element construction process calculates output values of one or more elements included in a first intermediate layer in accordance with an output value of an element included in the input layer when the output value of the element included in the input layer is given to the one or more elements included in the first intermediate layer, and calculates output values of one or more elements included in a g-th intermediate layer, where g=2, . . . , G, in accordance with an output value of an element included in a (g−1)-th intermediate layer, where g=2, . . . , G, when the output value of the element included in the (g−1)-th intermediate layer, where g=2, . . . , G, is given to the one or more elements included in the g-th intermediate layer, where g=2, . . . , G, and
the element construction process compares the output values of the one or more elements included in the g-th intermediate layer, where g=1, . . . G, calculated by the process with the threshold value, and maintains a number of elements included in the g-th intermediate layer, where g=1, . . . G, when an output value of any of the elements out of the output values of the one or more elements included in the g-th intermediate layer, where g=1, . . . G, is greater than the threshold value, and performs element construction processing of increasing the number of elements included in the g-th intermediate layer, where g=1, . . . G, when all of the output values of the one or more elements included in the g-th intermediate layer, where g=1, . . . G, are equal to or less than the threshold value.

11. The network construction apparatus according to claim 10, the training process further comprises updating parameters of the Gaussian function related to an element included in a G-th intermediate layer, where G is an integer equal to or greater than 2, and updating a weight between an element included in the G-th intermediate layer and an element included in the output layer, by performing supervised learning for learning the parameters of the Gaussian function when learning data is given to the input layer after the element construction processing is performed by the process.

12. The network construction apparatus according to claim 11, wherein the training process updates a weight between an element included in the (g−1)-th intermediate layer, where g=2, . . . , G, and an element included in g-th intermediate layer, where g=2, . . . , G, by performing the supervised learning.

13. The network construction apparatus according to claim 11, wherein the training process updates a weight between an element included in the input layer and an element included in the first intermediate layer, by performing the supervised learning.

14. The network construction apparatus according to claim 10, the element construction process further comprising to determine a number of the intermediate layers included in the neural network.

15. The network construction apparatus according to claim 14, wherein the element construction process determines the number of the intermediate layers from an input/output time of data in the neural network and an allowable time of the input/output time.

16. The network construction apparatus according to claim 14, wherein the element construction process determines the number of the intermediate layers from a learning time of the neural network and an allowable time of the learning time.

17. A network construction method for constructing a neural network having an input layer, one or more intermediate layers having a number of respective elements, and an output layer, where the input/output response of the respective elements of one or more intermediate layers is determined by a Gaussian function, the method comprising:
performing an element construction process to determine a structure of the one or more intermediate layers, the element construction processing including:
determining whether the one or more intermediate layers include at least one element and adding an element to the one or more intermediate layers in response to a determination that non elements currently exist;
initializing for each element included in an intermediate layer, parameters of a Gaussian function related to the element when the neural network is constructed, the neural network including the intermediate layer including an element whose input/output response is determined by the Gaussian function;
calculating output values of one or more elements included in the intermediate layer in accordance with the initialized parameters and an output value of an element included in the input layer of the neural network;
comparing the calculated output values of the one or more elements with a threshold value, and maintaining a number of elements included in the intermediate layer when an output value of any of the elements out of the output values of the one or more elements included in the intermediate layer is greater than the threshold value, and performing element construction processing of increasing the number of elements included in the intermediate layer when all of the output values of the one or more elements included in the intermediate layer are equal to or less than the threshold value, by an element construction step, and repeating the element construction processes until all pieces of learning data have been acquired; and performing a training process of updating the parameters of the Gaussian function and updating a weight between an element included in the one or more intermediate layers and an element included in the output layer, by performing supervised learning to learn the parameters of the Gaussian function when learning data is given to the input layer after the element construction processing is completed.

18. The network construction method according to claim 17, wherein the output value calculating step calculates an output value of each element included in the intermediate layer by substituting an output value of an element included in the input layer to the Gaussian function having parameters initialized by the initial setting step.

* * * * *